United States Patent
Lee et al.

(10) Patent No.: US 7,270,587 B2
(45) Date of Patent: *Sep. 18, 2007

(54) APPARATUS AND METHOD FOR MANUFACTURING LIQUID CRYSTAL DISPLAY DEVICES, METHOD FOR USING THE APPARATUS, AND DEVICE PRODUCED BY THE METHOD

(75) Inventors: Sang Seok Lee, Taegu-kwangyokshi (KR); Sang Ho Park, Pusan-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/132,191

(22) Filed: Apr. 26, 2002

(65) Prior Publication Data

US 2003/0171057 A1 Sep. 11, 2003

(30) Foreign Application Priority Data

Mar. 5, 2002  (KR) ............... 2002-11608
Apr. 13, 2002  (KR) ............... 2002-20205

(51) Int. Cl.
*H01J 9/38* (2006.01)
*H01J 9/46* (2006.01)
*H01J 9/48* (2006.01)

(52) U.S. Cl. ............ 445/73; 445/70; 445/66; 445/24; 445/25; 439/187; 439/189

(58) Field of Classification Search ............ 445/66, 445/67, 71, 70, 73, 24, 25, 60; 313/495–497; 349/187, 190, 191

See application file for complete search history.

(56) References Cited

U.S. PATENT DOCUMENTS

| 3,978,580 | A |   | 9/1976 | Leupp et al. |
| 4,094,058 | A |   | 6/1978 | Yasutake et al. .......... 29/592 R |
| 4,653,864 | A |   | 3/1987 | Baron et al. |
| 4,691,995 | A |   | 9/1987 | Yamazaki et al. ...... 350/331 R |
| 4,775,225 | A |   | 10/1988 | Tsuboyama et al. |
| 5,247,377 | A |   | 9/1993 | Omeis et al. ............. 359/76 |
| 5,263,888 | A |   | 11/1993 | Ishihara et al. |
| 5,379,139 | A |   | 1/1995 | Sato et al. |
| 5,406,989 | A |   | 4/1995 | Abe |
| 5,499,128 | A |   | 3/1996 | Hasegawa et al. |
| 5,507,323 | A |   | 4/1996 | Abe |
| 5,511,591 | A |   | 4/1996 | Abe ............................ 141/7 |
| 5,539,545 | A |   | 7/1996 | Shimizu et al. |
| 5,548,429 | A |   | 8/1996 | Tsujita |
| 5,568,297 | A | * | 10/1996 | Tsubota et al. ............ 156/145 |

(Continued)

FOREIGN PATENT DOCUMENTS

CN        1253305 A        5/2000

(Continued)

*Primary Examiner*—Mariceli Santiago
(74) *Attorney, Agent, or Firm*—McKenna Long & Aldridge LLP

(57) ABSTRACT

An apparatus for manufacturing a liquid crystal display device includes a unitary vacuum processing chamber, an upper stage affixing a second substrate and a lower stage affixing a first substrate, and a substrate receiving system provided within the vacuum processing chamber, moving along a first direction of the second substrate, and receiving the second substrate.

39 Claims, 23 Drawing Sheets

U.S. PATENT DOCUMENTS

| | | | |
|---|---|---|---|
| 5,642,214 A | 6/1997 | Ishii et al. ........ 349/96 |
| 5,680,189 A | 10/1997 | Shimizu et al. |
| 5,742,370 A | 4/1998 | Kim et al. ........ 349/124 |
| 5,757,451 A | 5/1998 | Miyazaki et al. |
| 5,852,484 A | 12/1998 | Inoue et al. |
| 5,854,664 A | 12/1998 | Inoue et al. |
| 5,861,932 A | 1/1999 | Inata et al. |
| 5,875,922 A | 3/1999 | Chastine et al. ........ 222/1 |
| 5,952,676 A | 9/1999 | Sato et al. |
| 5,956,112 A | 9/1999 | Fujimori et al. |
| 6,001,203 A | 12/1999 | Yamada et al. |
| 6,011,609 A | 1/2000 | Kato et al. ........ 349/190 |
| 6,016,178 A | 1/2000 | Kataoka et al. ........ 349/117 |
| 6,016,181 A | 1/2000 | Shimada |
| 6,055,035 A | 4/2000 | Von Gutfeld et al. ........ 349/187 |
| 6,163,357 A | 12/2000 | Nakamura ........ 349/155 |
| 6,219,126 B1 | 4/2001 | Von Gutfeld |
| 6,226,067 B1 | 5/2001 | Nishiguchi et al. ........ 349/155 |
| 6,236,445 B1 | 5/2001 | Foschaar et al. |
| 6,254,449 B1 * | 7/2001 | Nakanishi et al. ........ 445/25 |
| 6,304,306 B1 | 10/2001 | Shiomi et al. ........ 349/88 |
| 6,304,311 B1 | 10/2001 | Egami et al. ........ 349/189 |
| 6,337,730 B1 | 1/2002 | Ozaki et al. |
| 6,414,733 B1 | 7/2002 | Ishikawa et al. ........ 349/110 |
| 6,583,848 B2 * | 6/2003 | Hashimoto et al. ........ 349/187 |
| 6,821,176 B2 * | 11/2004 | Lee et al. ........ 445/24 |
| 6,829,032 B2 * | 12/2004 | Lee et al. ........ 349/187 |
| 2001/0021000 A1 | 9/2001 | Egami ........ 349/187 |
| 2003/0155069 A1 * | 8/2003 | Lee et al. ........ 156/285 |

FOREIGN PATENT DOCUMENTS

| | | |
|---|---|---|
| EP | 1 003 066 A1 | 5/2000 |
| JP | 51-65656 | 6/1976 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | S62-054225 | 3/1987 |
| JP | S62-054228 | 3/1987 |
| JP | S62-054229 | 3/1987 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 5-127179 | 5/1993 |
| JP | 5-154923 A | 6/1993 |
| JP | 5-265011 | 10/1993 |
| JP | 5-281557 | 10/1993 |
| JP | 5-281562 | 10/1993 |
| JP | H06-018829 | 1/1994 |
| JP | 6-51256 | 2/1994 |
| JP | H06-064229 | 3/1994 |
| JP | 6-148657 | 5/1994 |
| JP | 6-160871 | 6/1994 |
| JP | H06-194637 | 7/1994 |
| JP | 6-235925 A | 8/1994 |
| JP | 6-265915 | 9/1994 |
| JP | 6-313870 A | 11/1994 |
| JP | 7-84268 A | 3/1995 |
| JP | 7-128674 | 5/1995 |
| JP | 7-181507 | 7/1995 |
| JP | H07-275770 | 10/1995 |
| JP | H07-275771 | 10/1995 |
| JP | 8005973 | 1/1996 |
| JP | H08-076133 | 3/1996 |
| JP | 8-95066 | 4/1996 |
| JP | 8-101395 A | 4/1996 |
| JP | 8-106101 | 4/1996 |
| JP | H08-110504 | 4/1996 |
| JP | H08-136937 | 5/1996 |
| JP | 8-171094 | 7/1996 |
| JP | 8-190099 | 7/1996 |
| JP | H08-173874 | 7/1996 |
| JP | 8-240807 | 9/1996 |
| JP | 9-5762 | 1/1997 |
| JP | 9-26578 | 1/1997 |
| JP | H09-001026 | 1/1997 |
| JP | 9-61829 A | 3/1997 |
| JP | 9-73075 | 3/1997 |
| JP | 9-73096 | 3/1997 |
| JP | H09-094500 | 4/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 A | 6/1998 |
| JP | H10-174924 | 6/1998 |
| JP | 10-221700 | 8/1998 |
| JP | 10-282512 | 10/1998 |
| JP | 10-333157 A | 12/1998 |
| JP | 10-333159 A | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 A | 5/1999 |
| JP | 11-142864 A | 5/1999 |
| JP | 11-174477 | 7/1999 |
| JP | 11-212045 | 8/1999 |
| JP | 11-248930 A | 9/1999 |
| JP | H11-262712 | 9/1999 |
| JP | H11-264991 | 9/1999 |
| JP | 11-326922 A | 11/1999 |
| JP | 11-344714 | 12/1999 |
| JP | 2000-2879 A | 1/2000 |
| JP | 2000-29035 | 1/2000 |
| JP | 2000-56311 A | 2/2000 |
| JP | 2000-66165 A | 3/2000 |
| JP | 2000-066218 | 3/2000 |
| JP | 2000-093866 | 4/2000 |
| JP | 2000-137235 A | 5/2000 |
| JP | 2000-147528 A | 5/2000 |
| JP | 2000-193988 A | 7/2000 |
| JP | 2000-241824 A | 9/2000 |
| JP | 2000-284295 | 10/2000 |
| JP | 2000-284295 A | 10/2000 |
| JP | 2000-292799 A | 10/2000 |
| JP | 2000-310759 A | 11/2000 |
| JP | 2000-310784 A | 11/2000 |
| JP | 2000-338501 A | 12/2000 |
| JP | 2001-5401 A | 1/2001 |
| JP | 2001-005405 | 1/2001 |
| JP | 2001-5405 A | 1/2001 |
| JP | 2001-13506 A | 1/2001 |
| JP | 2001-33793 A | 2/2001 |
| JP | 2001-42341 A | 2/2001 |
| JP | 2001-51284 A | 2/2001 |

| | | | | | | |
|---|---|---|---|---|---|---|
| JP | 2001-66615 A | 3/2001 | | JP | 2002-107740 | 4/2002 |
| JP | 2001-91727 A | 4/2001 | | JP | 2002-122870 | 4/2002 |
| JP | 2001-117105 | 4/2001 | | JP | 2002-122872 | 4/2002 |
| JP | 2001-117109 A | 4/2001 | | JP | 2002-122873 | 4/2002 |
| JP | 2001-133745 A | 5/2001 | | JP | 2002-131762 | 5/2002 |
| JP | 2001-133794 | 5/2001 | | JP | 2002-139734 | 5/2002 |
| JP | 2001-133799 A | 5/2001 | | JP | 2002-156518 | 5/2002 |
| JP | 2001-142074 | 5/2001 | | JP | 2002-169166 | 6/2002 |
| JP | 2001-147437 | 5/2001 | | JP | 2002-169167 | 6/2002 |
| JP | 2001-154211 | 6/2001 | | JP | 2002-182222 | 6/2002 |
| JP | 2001-166272 A | 6/2001 | | JP | 2002-202512 | 7/2002 |
| JP | 2001-166310 A | 6/2001 | | JP | 2002-202514 | 7/2002 |
| JP | 2001-183683 A | 7/2001 | | JP | 2002-214626 | 7/2002 |
| JP | 2001-201750 A | 7/2001 | | JP | 2002-229042 | 8/2002 |
| JP | 2001-209052 A | 8/2001 | | JP | 2002-236276 | 8/2002 |
| JP | 2001-209056 | 8/2001 | | JP | 2002-258299 | 8/2002 |
| JP | 2001-209057 | 8/2001 | | JP | 2002-236292 | 9/2002 |
| JP | 2001-209058 | 8/2001 | | JP | 2002-277865 | 9/2002 |
| JP | 2001-209060 A | 8/2001 | | JP | 2002-277866 | 9/2002 |
| JP | 2001-215459 A | 8/2001 | | JP | 2002-277881 | 9/2002 |
| JP | 2001-222017 A | 8/2001 | | JP | 2002-287156 | 10/2002 |
| JP | 2001-235758 A | 8/2001 | | JP | 2002-296605 | 10/2002 |
| JP | 2001-255542 | 9/2001 | | JP | 2002-311438 | 10/2002 |
| JP | 2001-264782 | 9/2001 | | JP | 2002-311440 | 10/2002 |
| JP | 2001-272640 A | 10/2001 | | JP | 2002-311442 | 10/2002 |
| JP | 2001-281675 A | 10/2001 | | JP | 2002-323687 | 11/2002 |
| JP | 2001-281678 A | 10/2001 | | JP | 2002-323694 | 11/2002 |
| JP | 2001-282126 A | 10/2001 | | JP | 2002-333628 | 11/2002 |
| JP | 2001-305563 A | 10/2001 | | JP | 2002-333635 | 11/2002 |
| JP | 2001-330837 A | 11/2001 | | JP | 2002-333843 | 11/2002 |
| JP | 2001-330840 | 11/2001 | | JP | 2002-341329 | 11/2002 |
| JP | 2001-356353 A | 12/2001 | | JP | 2002-341355 | 11/2002 |
| JP | 2001-356354 | 12/2001 | | JP | 2002-341356 | 11/2002 |
| JP | 2002-14360 | 1/2002 | | JP | 2002-341357 | 11/2002 |
| JP | 2002-23176 | 1/2002 | | JP | 2002-341358 | 11/2002 |
| JP | 2002-49045 | 2/2002 | | JP | 2002-341359 | 11/2002 |
| JP | 2002-079160 | 3/2002 | | JP | 2002-341362 | 11/2002 |
| JP | 2002-080321 | 3/2002 | | KR | 2000-0035302 A | 6/2000 |
| JP | 2002-82340 | 3/2002 | | | | |
| JP | 2002-90759 | 3/2002 | | * cited by examiner | | |
| JP | 2002-90760 | 3/2002 | | | | |

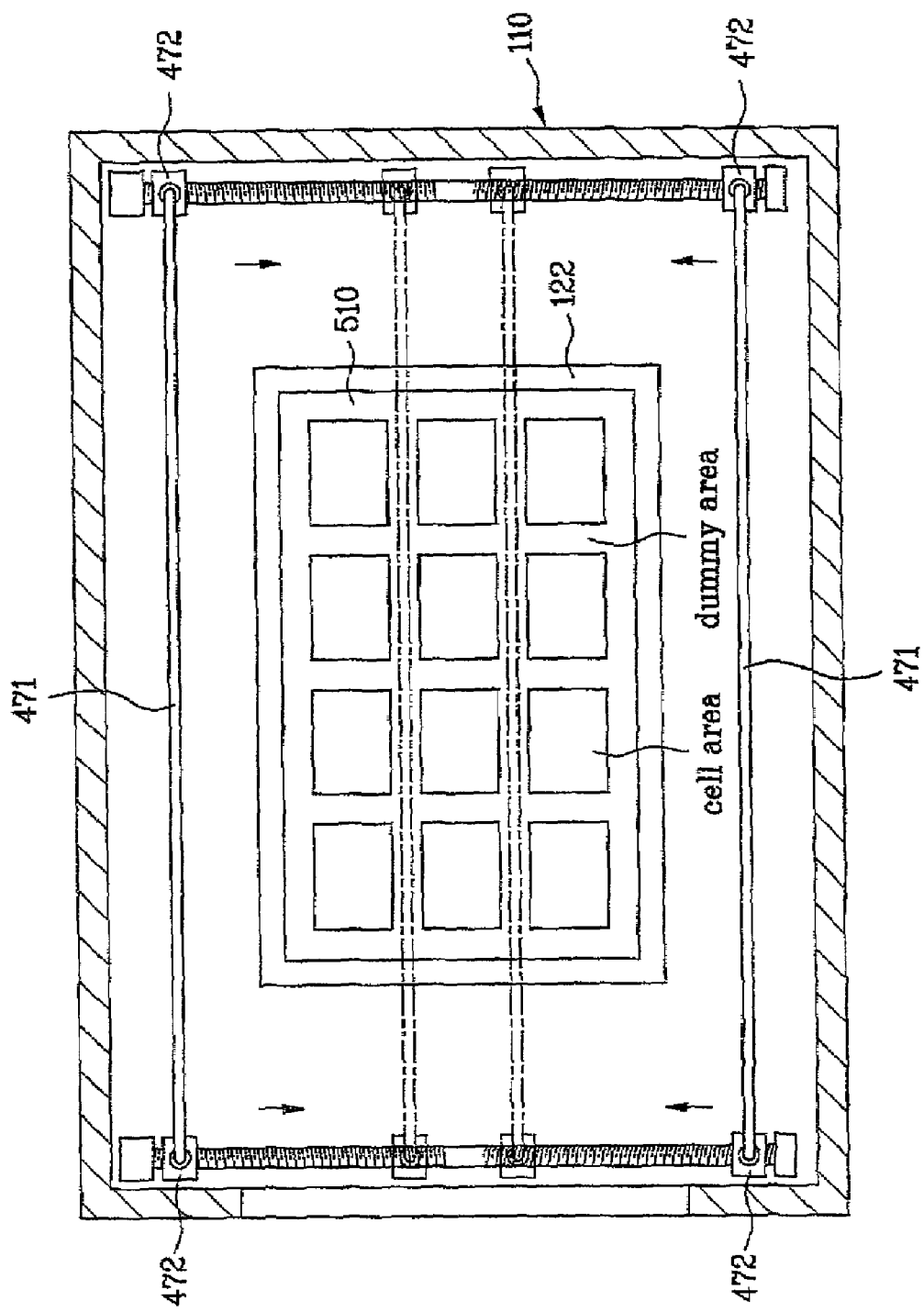

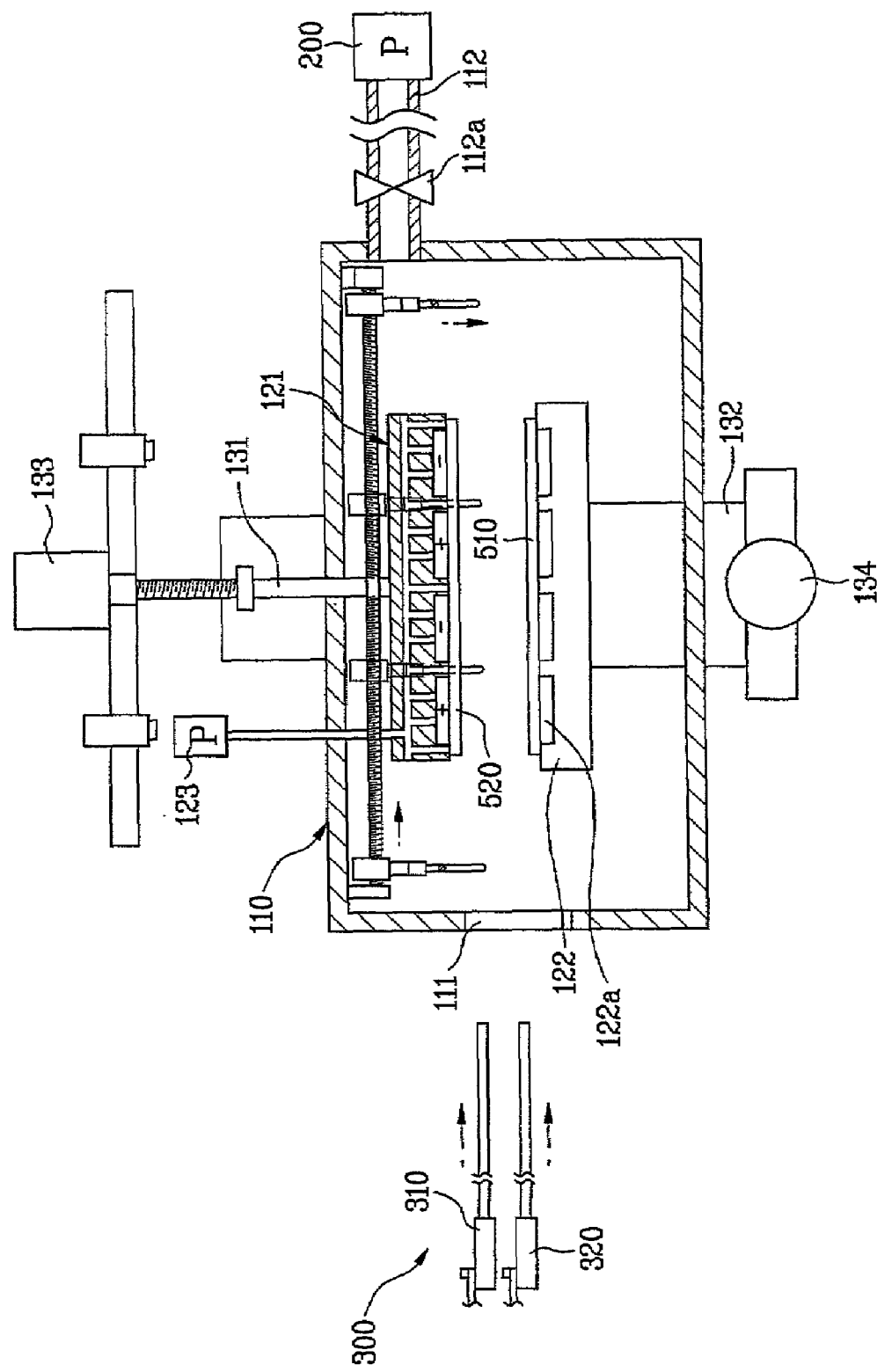

APPARATUS AND METHOD FOR MANUFACTURING LIQUID CRYSTAL DISPLAY DEVICES, METHOD FOR USING THE APPARATUS, AND DEVICE PRODUCED BY THE METHOD

The present invention application claims the benefit of the Korean Application Nos. P2002-11608 filed in Korea on Mar. 5, 2002 and P2002-20205 filed in Korea on Apr. 13, 2002, which are hereby incorporated by reference.

BACKGROUND OF THE INVENTION

1. Field of the Invention

The present invention relates to a manufacturing apparatus, and more particularly, to an apparatus for manufacturing a liquid crystal display suitable for a large-sized liquid crystal display.

2. Discussion of the Related Art

In general, recent developments in the information communication field have increased demand for various types of displays devices. In response to this demand, various flat panel type displays such as liquid crystal display (LCD), plasma display panel (PDP), electro-luminescent display (ELD), and vacuum fluorescent display (VFD) have been developed to replace conventional cathode ray tube (CRT) devices. In particular, LCD devices have been used because of their high resolution, light weight, thin profile, and low power consumption. In addition, LCD devices have been implemented in mobile devices such as monitors for notebook computers. Furthermore, LCD devices have been developed for monitors of computer and television to receive and display broadcasting signals.

Accordingly, efforts to improve image quality of LCD devices contrast with the benefits of their high resolution, light weight, thin profile, and low power consumption. In order to incorporate LCD devices as a general image display, image quality such as fineness, brightness, large-sized area, for example, must be realized.

A plurality of gate lines are formed along one direction at fixed intervals on the first glass substrate (TFT array substrate), and a plurality of data lines are formed along a second direction perpendicular to one direction of the plurality of gate lines, thereby defining a plurality of pixel regions. Then, a plurality of pixel electrodes are formed in a matrix arrangement at the pixel regions, and a plurality of thin film transistors (TFT) are formed at the pixel regions. Accordingly, the plurality of thin film transistors are switched by signals transmitted along the gate lines and transfer signals transmitted along the data lines to each pixel electrode. In order to prevent light leakage, black matrix films are formed on the second glass substrate (color filter substrate) except at regions of the second glass substrate that correspond to the pixel regions of the first glass substrate.

A process for manufacturing an LCD device using a TFT substrate and a color filter substrate will be described with reference to a manufacturing apparatus according to the related art.

The process for manufacturing an LCD device according to the related art includes steps of forming a sealant pattern on one of a first and second substrate to form an injection inlet, bonding the first and second substrates to each other within a vacuum processing chamber, and injecting liquid crystal material through the injection inlet. In another process of manufacturing an LCD device according to the related art, a liquid crystal dropping method, which is disclosed in Japanese Patent Application No. 11-089612 and 11-172903, includes steps of dropping liquid crystal material on a first substrate, arranging a second substrate over the first substrate, and moving the first and second substrates, thereby bonding the first and second substrates to each other. Compared to the liquid crystal injection method, the liquid crystal dropping method is advantageous in that various steps such as, formation of a liquid crystal material injection inlet, injection of the liquid crystal material, and sealing of the injection inlet are unnecessary since the liquid crystal material is predisposed on the first substrate.

FIGS. 1 and 2 show cross sectional views of a substrate bonding device using the liquid crystal dropping method according to the related art. In FIG. 1, the substrate bonding device includes a frame 10, an upper stage 21, a lower stage 22, a sealant dispenser (not shown), a liquid crystal material dispensor 30, a processing chamber includes an upper chamber unit 31 and a lower chamber unit 32, a chamber moving system 40, and a stage moving system 50. The chamber moving system 40 includes a driving motor driven to selectively move the lower chamber unit 32 to a location at which the bonding process is carried out, or to a location at which outflow of the sealant occurs and dropping of the liquid crystal material. The stage moving system 50 includes another driving motor driven to selectively move the upper stage 21 along a vertical direction perpendicular to the upper and lower stages 21 and 22. A receiving system temporarily receives a substrate 52 at opposite diagonal portions of the substrate 52. The receiving system is attached to the upper stage 21, and includes a rotational axis 61 provided to extend from an exterior of the upper chamber unit 31 to an interior of the upper chamber unit 31, a rotational actuator 63 fixed to the exterior of the upper chamber unit 31 at one end of the rotational axis 61 and driven to selectively rotate the rotational axis 61, an elevating actuator 64 selectively elevating the rotational actuator 63, and a receiving plate 62 provided at the other end of the rotational axis 61 to form a single body with the rotational axis 61, thereby selectively supporting opposite edge portions of the substrate 52.

A process of manufacturing a liquid crystal display device using the substrate assembly device according to the prior art follows. First, a second substrate 52 is loaded upon the upper stage 21, and a first substrate 51 is loaded upon the lower stage 22. Then, the lower chamber unit 32 having the lower stage 22 is moved to a processing location (S1) by the chamber moving system 40 for sealant dispensing and liquid crystal material dispensing. Subsequently, the lower chamber unit 32 is moved to a processing location (S2) for substrate bonding by the chamber moving system 40. Thereafter, the upper and lower chamber units 31 and 32 are assembled together by the chamber moving system 40 to form a vacuum tight seal, and a pressure in the chamber is reduced by a vacuum generating system (not shown). The elevating actuator 64 is driven to move the rotational axis 61 toward a lower part of the upper stage 21, and at the same time the rotational actuator 63 is driven to rotate the rotational axis 61 so that the receiving plate 62 is positioned at both edges of the second substrate 52 fixed to the upper stage 21.

FIGS. 2 and 3 show a perspective view of an operational state of a receiving system of a substrate assembly device according to a prior art. In FIGS. 2 and 3, when the stage moving system 50 moves the upper stage 21 downward in close corresponding to a height at which the receiving plate 62 is positioned.

When a vacuum state is achieved inside the assembled chamber, the second substrate 52 may fall from the upper stage 21 since the vacuum pressure within the chamber is larger than the vacuum force affixing the second substrate 52 to the upper stages 21. Accordingly, before the desired vacuum pressure within the chamber is achieved, it is necessary to keep the second substrate 52 temporarily affixed to the upper stage 21. Once the desired vacuum pressure within the chamber part is attained, the second substrate 52 is affixed to the upper stage 21 by application an electrostatic force to the upper stage 21. Accordingly, the receiving plates 62 and rotational axis 61 are returned to original standby locations by driving the rotational actuator 63 of the receiving system and the elevating actuator 64.

Then, the upper stage 21 is moved downwardly by the stage moving system 50 at the above-mentioned vacuum state so as to closely fasten the second substrate 52 fixed to the upper stage 21 to the first substrate 51 fixed to the lower stage 22. Further, the process for bonding the respective substrates to each other is carried out through a continuous pressurization, thereby completing the manufacture of the LCD device.

However, the substrate assembly device according to the prior art is problematic. First, the substrate assembly device according the prior art fails to provide a subsidiary system or device for stable loading of the substrate at the lower stage or unloading the bonded substrates from the lower stage, thereby creating a high probability that damage to the substrate(s) may occur during the loading/unloading process. Specifically, the bonded substrates may adhere to a upper surface of the lower stage during the bonding process. Second, when the bonded substrates are unloaded, central or circumferential portions of the bonded substrates will be free of droop. Specifically, considering that the size of LCD devices are increasing to meet demand, preventing droop during unloading of the bonded substrates is extremely important and necessary.

SUMMARY OF THE INVENTION

Accordingly, the present invention is directed to an apparatus and method for manufacturing liquid crystal display devices, method for using the apparatus, and device produced by the method that substantially obviates one or more problems due to limitations and disadvantages of the prior art.

An object of the present invention is to provide an apparatus and method for manufacturing liquid crystal display devices having a substrate receiving system that can prevent a specific portion of a target substrate from being distorted.

Another object of the present invention is to provide method for using an apparatus for manufacturing a liquid crystal display having a substrate receiving system suitable for manufacture of a large-sized liquid crystal display.

Another object of the present invention is to provide a device produced by the method having a substrate receiving system suitable for manufacture of a large-sized liquid crystal display.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, an apparatus for manufacturing a liquid crystal display device includes a unitary vacuum processing chamber, upper and lower stages, the upper stage affixing a second substrate and the lower stage affixing a first substrate, and a substrate receiving system provided within the vacuum processing chamber, moving along a loading/unloading direction of each substrate, and receiving a lower surface of the second substrate.

In another aspect of the present invention, an apparatus for manufacturing a liquid crystal display device includes a unitary vacuum processing chamber, upper and lower stages, the upper stage affixing a second substrate and the lower stage affixing a first substrate, and a substrate receiving system provided within the vacuum processing chamber, moving along a direction vertical to a loading/unloading direction of each substrate, and receiving a lower surface of the second substrate.

In another aspect, a method for manufacturing a liquid crystal display device includes affixing a first substrate onto a lower stage within a unitary vacuum processing chamber, affixing a second substrate onto an upper stage within the unitary vacuum chamber, receiving a lower surface of the second substrate onto a substrate receiving system provided within the unitary vacuum processing chamber, the substrate receiving system moving along a loading/unloading direction of the first and second substrates.

In another aspect, a liquid crystal display device manufactured by a method including affixing a first substrate onto a lower stage within a unitary vacuum processing chamber, affixing a second substrate onto an upper stage within the unitary vacuum chamber, receiving a lower surface of the second substrate onto a substrate receiving system provided within the unitary vacuum processing chamber, the substrate receiving system moving along a loading/unloading direction of the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 22 is a plane view showing another exemplary apparatus according to the present invention; and FIG. 23 is a cross sectional view showing another exemplary apparatus according to the present invention.

DETAILED DESCRIPTION OF THE INVENTION

Reference will now be made in detail to the preferred embodiments of the present invention, examples of which are illustrated in the accompanying drawings.

Figure 1:
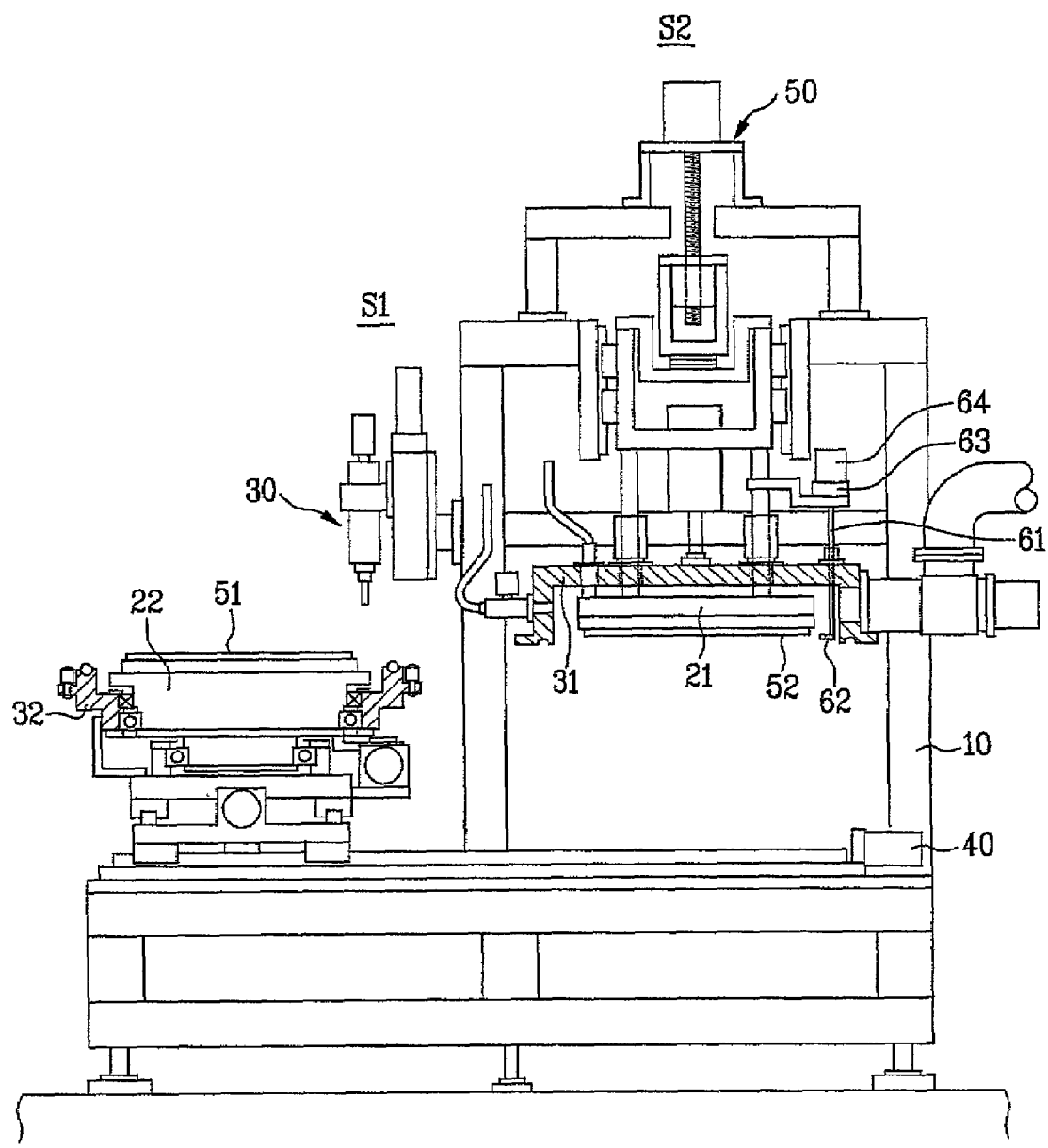
FIGS. 1 and 2 are cross sectional views of a substrate assembly devices using a liquid crystal dropping method according to the prior art.
Figure 2:
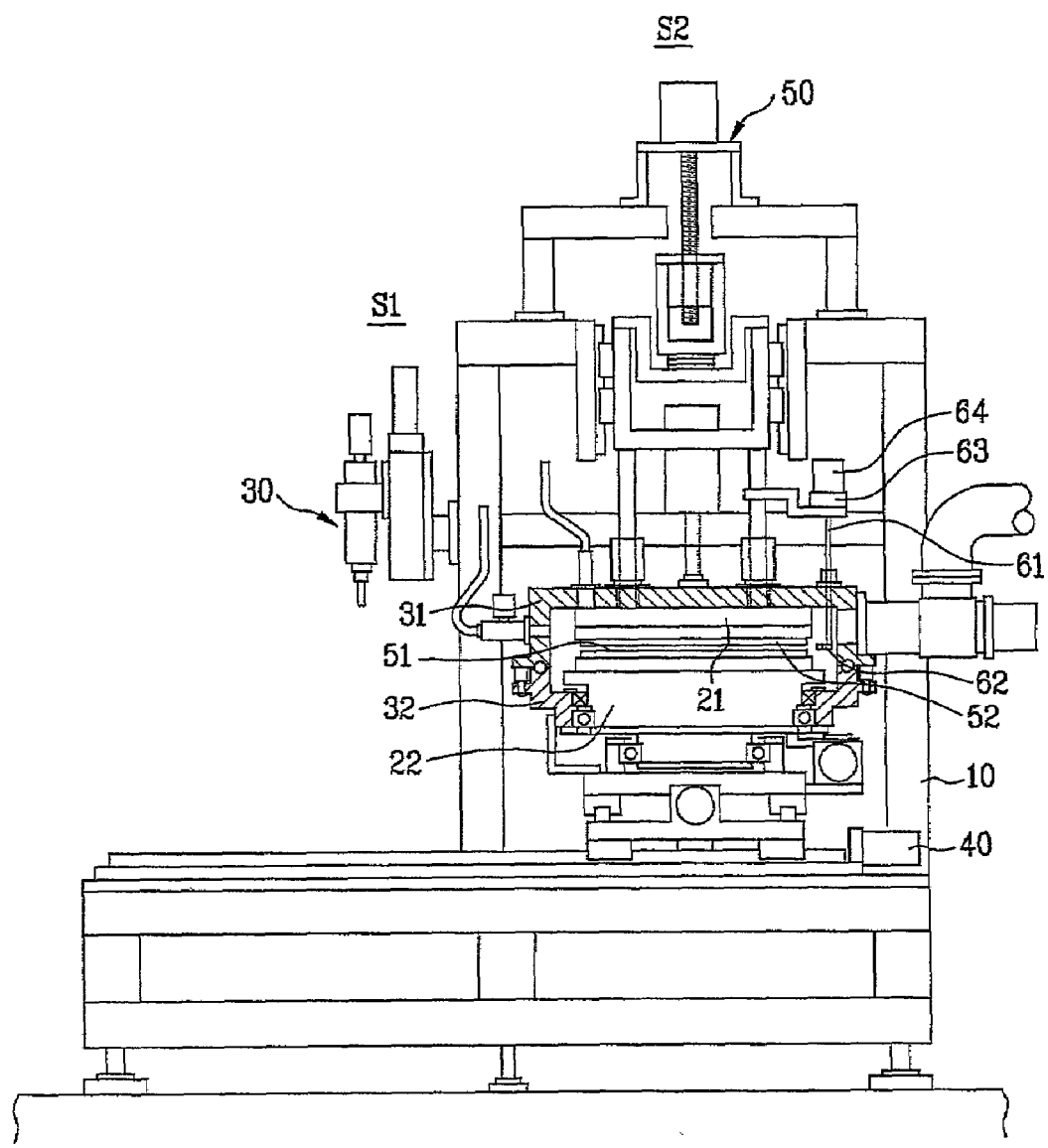
Figure 3:
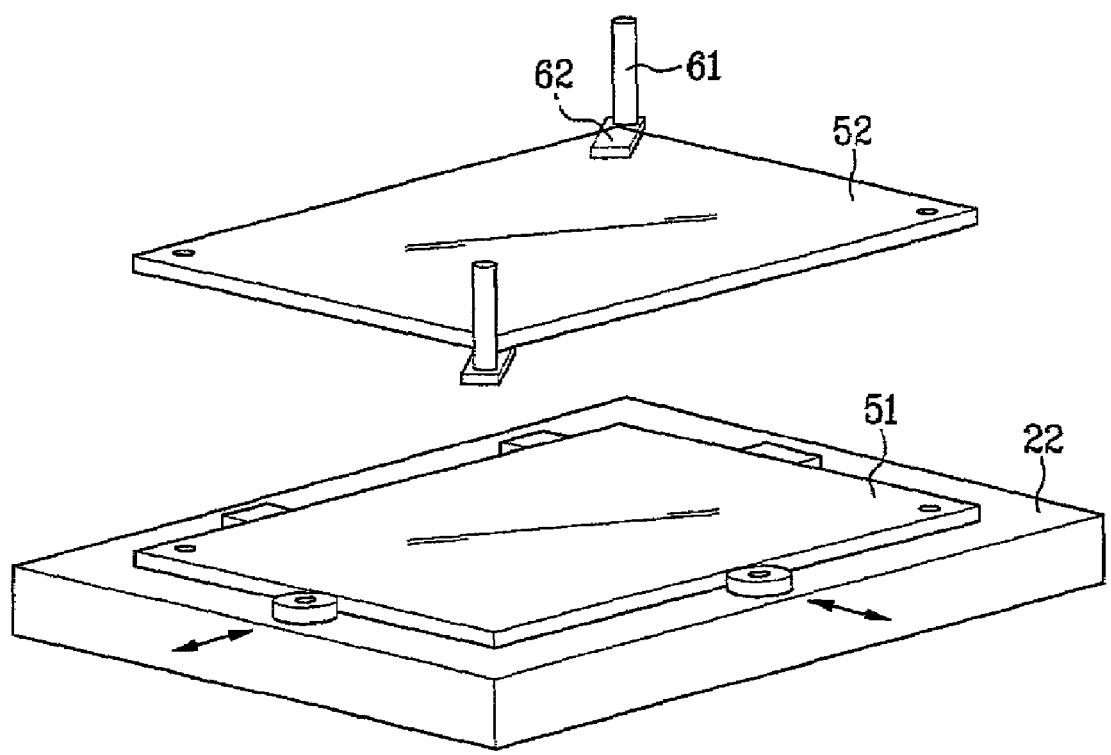
FIG. 3 is a perspective view showing an operational state of a receiving system of a substrate assembly device according to the related art.
Figure 4:
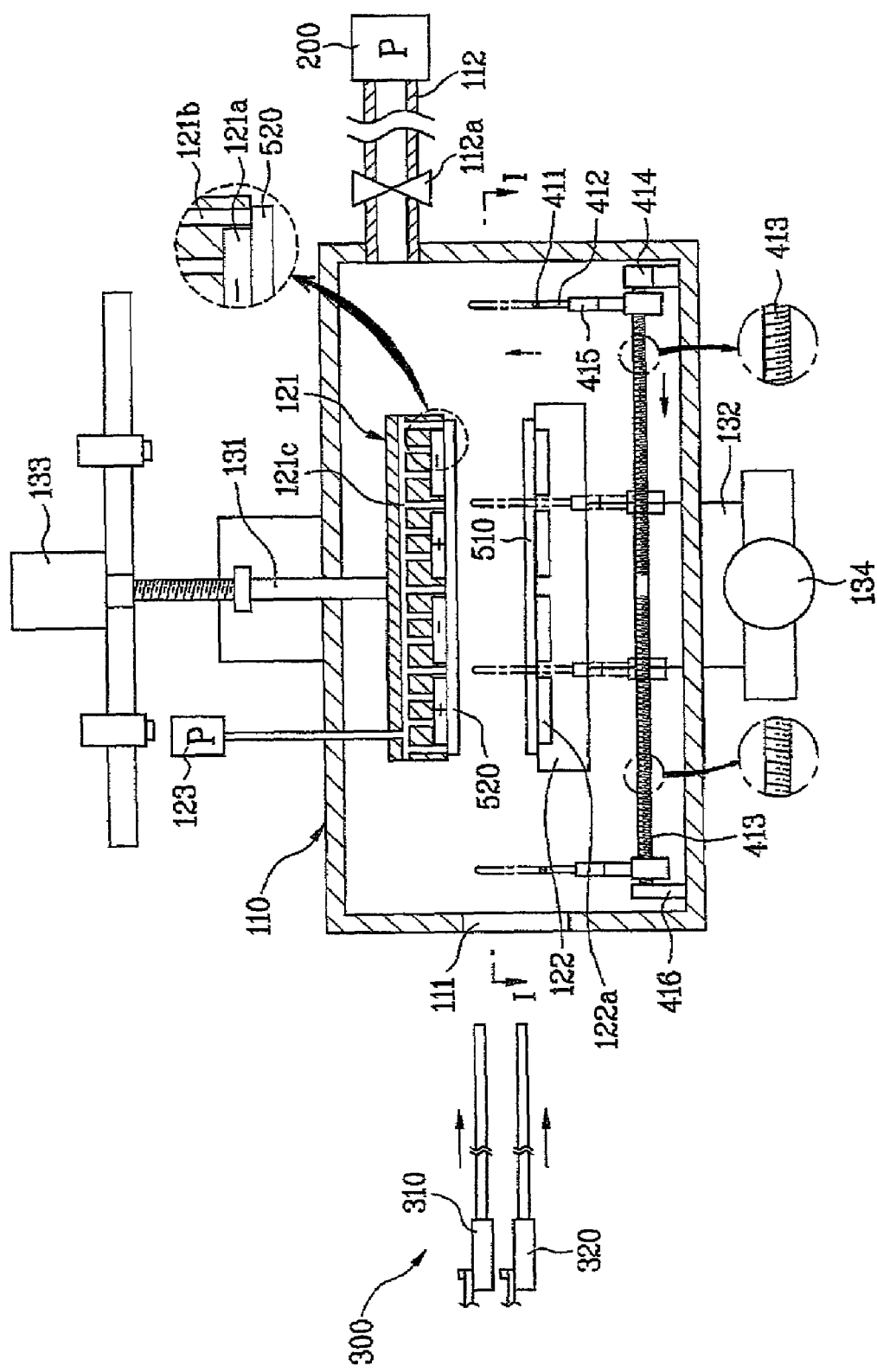
FIG. 4 is a cross sectional view of an exemplary apparatus according to the present invention.
Figure 5:
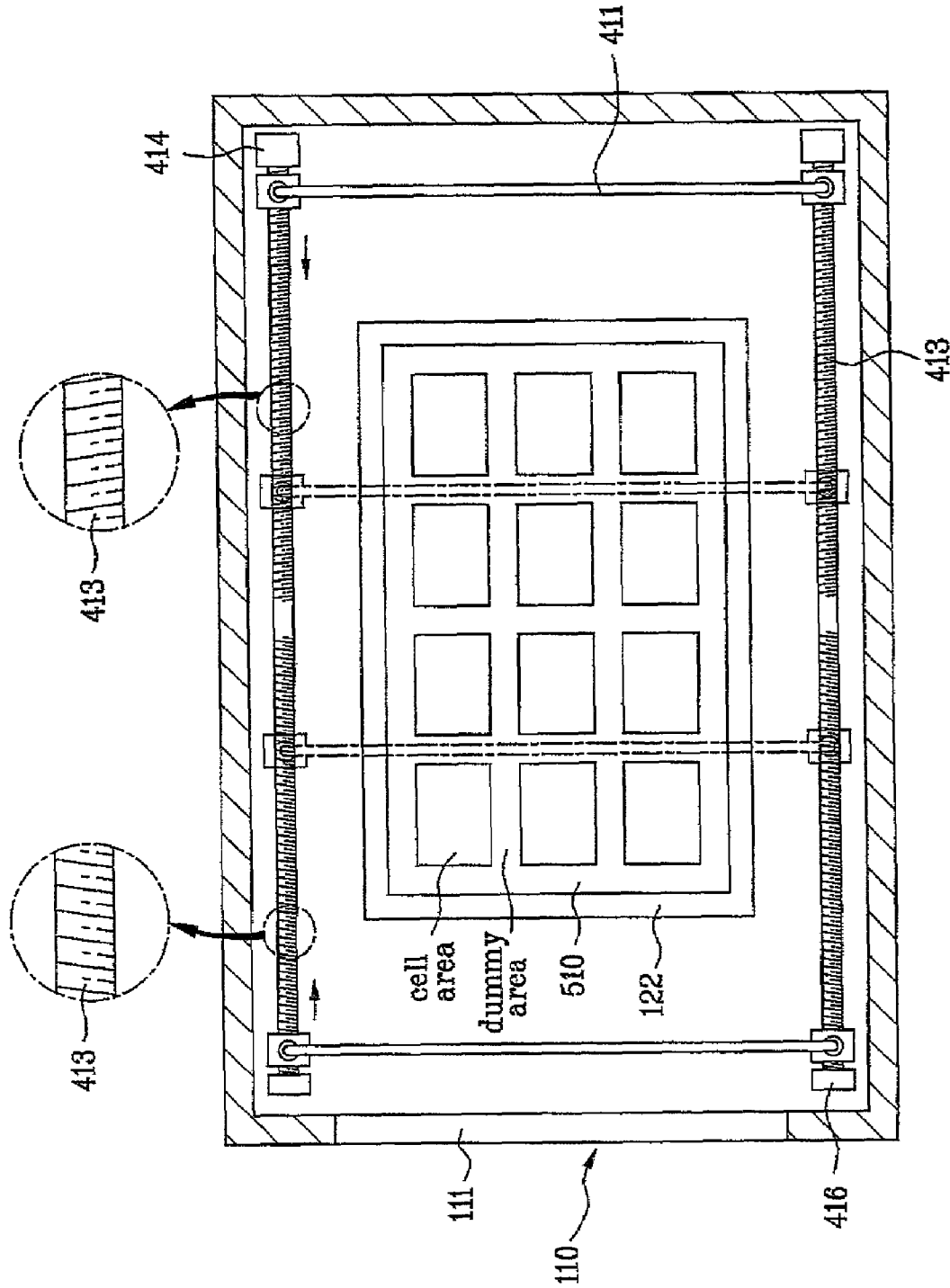
FIG. 5 is a plane view along line I-I of FIG. 4 according to the present invention.
Figure 6:
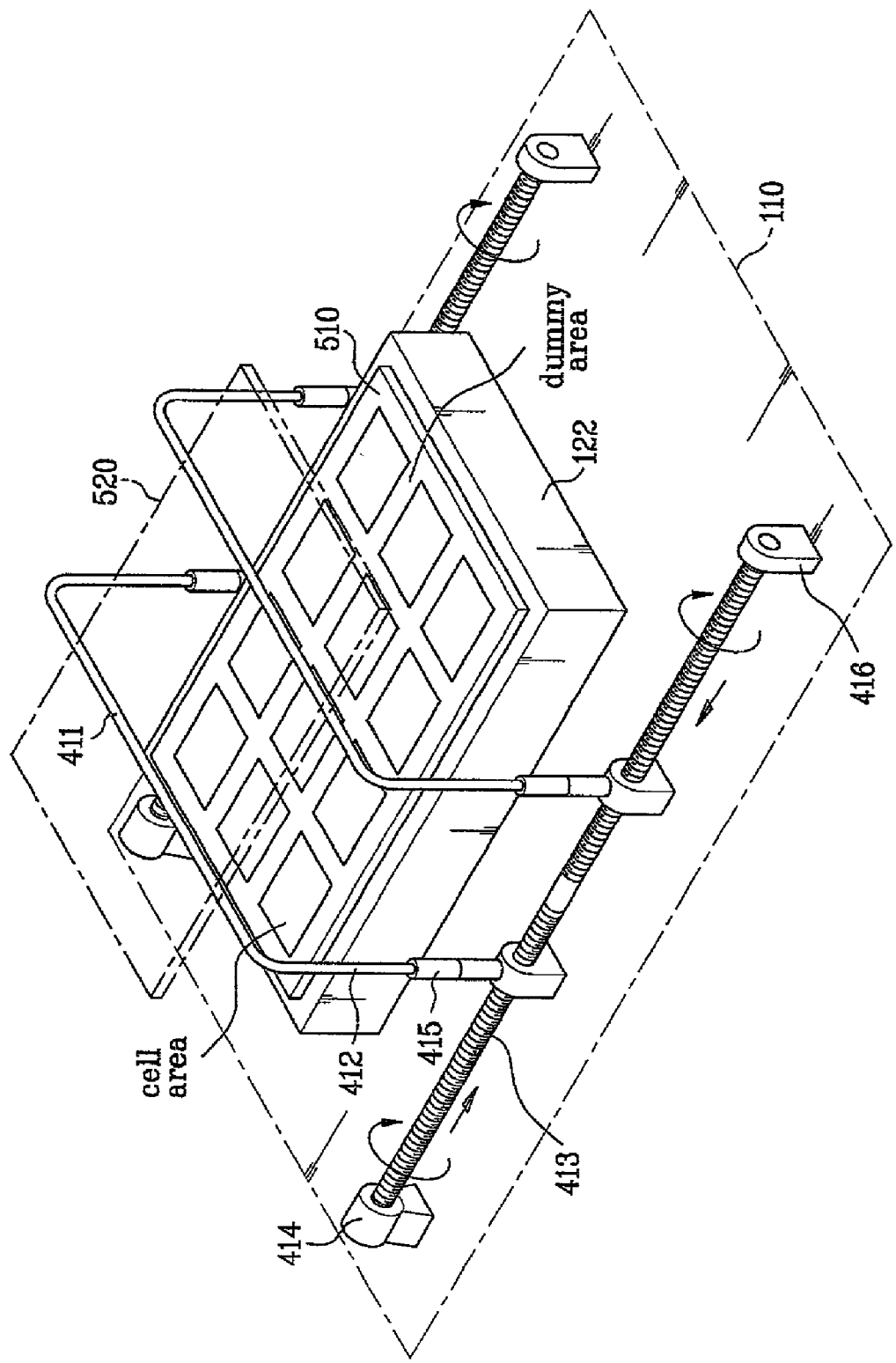
FIG. 6 is a perspective view of an operational state of the exemplary substrate receiving system according to the present invention.

FIGS. 4 to 6 illustrate an exemplary apparatus for a liquid crystal display (LCD) device according to the first embodiment of the present invention. In FIGS. 4 to 6, the apparatus may include a vacuum processing chamber 110, an upper stage 121, a lower stage 122, a stage moving device, a vacuum device 200, a loader part 300, and a substrate receiving system.

The vacuum processing chamber 110 has an interior that may be placed under a vacuum pressure or atmospheric state so that bonding work between substrates may be performed. An air outlet 112 transfers a vacuum force generated by the vacuum device 200 the vacuum processing chamber 110 via a air outlet valve 112a.

The upper and lower stages 121 and 122 may be provided at upper and lower spaces inside the vacuum processing chamber 110, respectively, so as to oppose each other. The upper and lower stages 121 and 122 affix first and second substrates 510 and 520, which are carried into the vacuum processing chamber 110, by a vacuum or electrostatic force. The upper and lower stages 121 and 122 travel in a vertical direction to bond the first and second substrates 510 and 520. Accordingly, a lower surface of the upper stage 121 may be provided with at least one electrostatic chuck (ESC) 121a to fix the first and second substrates 510 and 520 to the upper and lower stages 121 and 122, respectively, by a plurality of electrostatic plates.

In addition to the electrostatic chuck 121a, at plurality of vacuum holes 121b may be further provided at the lower surface of the upper stage 121 to apply a vacuum force to the second substrate 520, thereby affixing the second substrate 520 by a vacuum force. The plurality of vacuum holes 121b may be arranged along a circumference of the electrostatic chuck 121a. The plurality of vacuum holes 121b may be connected to each other through at least one or a plurality of pipe lines 121c so as to receive a vacuum force generated by a vacuum pump 123 that is connected to the upper stage 121. In addition, at least one electrostatic chuck 122a may also be provided at a upper surface of the lower stage 122, and at least one vacuum hole (not shown) may be provided along a circumference of the electrostatic chuck 122a.

However, the construction of the electrostatic chuck 122a and the plurality of vacuum holes (not shown) at the upper surface of the lower stage 122 may not be limited to a configuration of the upper stage 121. Moreover, the electrostatic chuck 122a and the plurality of vacuum holes (not shown) at the upper surface of the lower stage 122 may be arranged to consider an overall shape of a target substrate.

The stage moving device includes a upper stage moving axis 131 connected to the upper stage 121 to move the upper stage 121 along a vertical direction, a lower stage rotational axis 132 connected to the lower stage 122 to rotate the lower stage 122 clockwise or counterclockwise, an upper driving motor 133 axially coupled to the upper stage 121, and a lower driving motor 134 axially coupled to the lower stage 122 at an exterior or interior of the vacuum processing chamber 110. Accordingly, the stage moving device may not be limited to a configuration that moves the upper stage 121 along the vertical direction and rotates the lower stage 122 clockwise or counterclockwise. The stage moving device may enable the upper stage 121 to rotate clockwise or counterclockwise, and move the lower stage 122 along the vertical direction. In this case, a subsidiary rotational axis (not shown) may be added to the upper stage 121 to enable its rotation, and a subsidiary moving axis (not shown) may be added to the lower stage 122 to enable movement in the vertical direction.

The vacuum device 200 transfers a vacuum force to enable a vacuum state inside the vacuum processing chamber 110, and may include a vacuum pump driven to generate a general vacuum force.

The loader part 300 may be arranged outside of the vacuum processing chamber 110 separately from various elements provided inside the vacuum processing chamber 110. The loader part 300 may include a first arm 310 and a second arm 320. The first arm 310 loads the first substrate 510 upon which liquid crystal material is dropped, into the vacuum processing chamber 110. The second arm 320 loads the second substrate 520 upon which a sealant is dispensed, into the vacuum processing chamber 110. Alternatively, the liquid crystal material may be deposited (i.e., droped, dispensed) on the first substrate 510, which may be a TFT array substrate, and the sealant may be deposited on the second substrate 520, which may be a color filter (C/F) substrate. Moreover, both the liquid crystal material and the sealant may be deposited on the first substrate 510, which may be a TFT array substrate, and the second substrate 520, which may be a C/F substrate, may not have either of the liquid crystal material or the sealant deposited thereon. Furthermore, both the liquid crystal material and the sealant may be deposited on the first substrate 510, which may be a C/F substrate, and the second substrate 520, which may be a TFT array substrate, may not have either of the liquid crystal material or the sealant deposited thereon. The first substrate 510 may include one of a TFT array substrate and a C/F substrate, and the second substrate 520 may include another one of the TFT substrate and the C/F substrate.

If the liquid crystal material and the sealant may be deposited on one of the first and second substrates, the first arm 310 loads the target substrate while the second arm 320 loads the other substrate.

During the loading of the first and second substrates 510 and 520, the first arm 310 may be placed over the second arm 320. Thus, the liquid crystal material is dropped on the first substrate 510. In other words, if the second arm 320 is placed over the first arm 310, various particles generated from the motion of the second arm 320 may be caused to fall onto the liquid crystal material dropped on the first substrate 510 mounted on the first arm 310 so as to cause damage thereupon. Thus, the first arm 310 is placed over the second arm 320, thereby avoiding the damage by contamination.

Figure 7A:
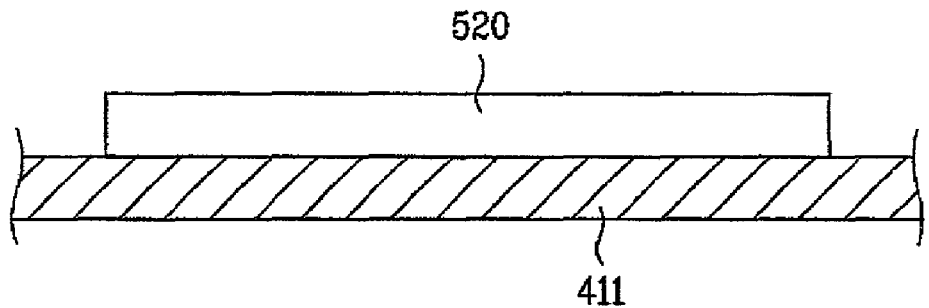
FIGS. 7A to 7C are cross sectional views showing a contact state between a substrate and a lift-bar according to the present invention.
Figure 7B:
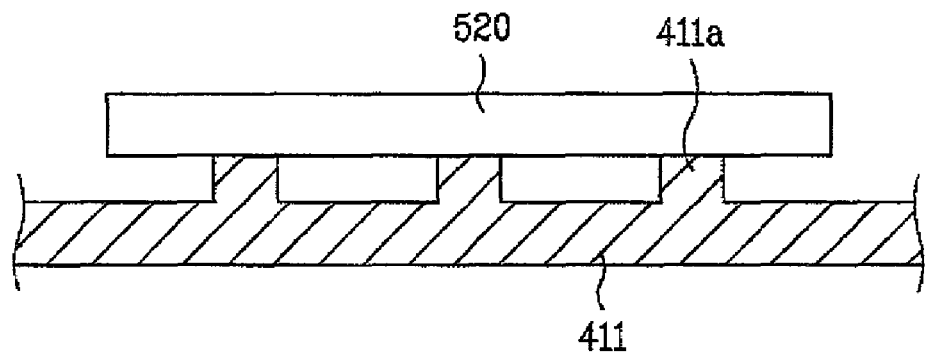
Figure 7C:
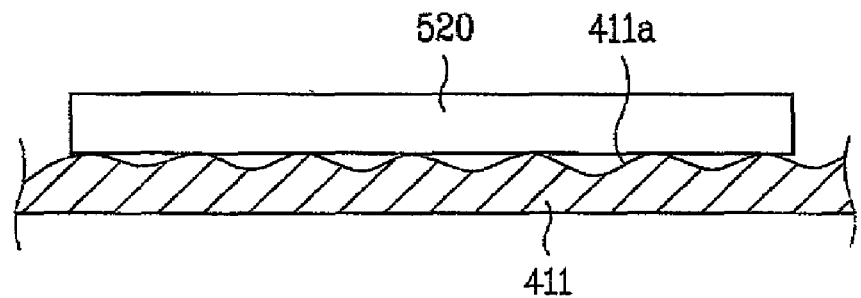

The substrate receiving system may be constructed to receive the second substrate 520 that is to be affixed to the upper stage 121 while moving along the loading/unloading direction of the substrate. The substrate receiving system may include a lifting part and a moving part. The lifting part may include a lift-bar 411 and a support 412. The lift bar 411 may be longitudinally formed along a width direction of the second substrate 520 to support the lower surface of the second substrate 520 affixed to the upper stage 121. Alternatively, the lift-bar 411, as shown in FIG. 7A, may be constructed to support the second substrate 520 by an area contact with the second substrate 520. Furthermore, the lift-bar 411 may have at least one protrusion 411*a* which is in contact with the lower surface of the second substrate 520 at a upper surface of the lift-bar 411 so that the protrusion 411*a* can support the second substrate 520 by dot contact with the second substrate 520. The protrusion 411*a* may be formed as shown in FIG. 7B or FIG. 7C.

The support 412 has one end connected to one end of the lift-bar 411 and the other end connected to the moving part to support the lift-bar 411. In addition, at least two or more lifting parts may be provided to simultaneously support each part of the second substrate 520, thereby preventing the second substrate 520 from drooping. In particular, the lifting part may be constructed to selectively support a dummy area among respective portions of the second substrate 520, thereby preventing damage due to contact with a cell area from occurring and preventing the second substrate 520 from bowing or curving.

The moving part may include a screw axis 413 and a driving motor 414 to move the lifting part along a horizontal direction. Accordingly, as shown in FIGS. 4 to 6, the screw axis 413 may be longitudinally provided along the longitudinal side of the lower stage 122 within the vacuum processing chamber 110. The driving motor 414 may be axially fixed into the screw axis 413. Accordingly, the screw direction of the screw axis 413 may be formed so that both sides around the center are directed in different directions. That is, one side of the screw axis 413 is provided with a right-hand screw while the other side of the screw axis 413 may be provided with a left-hand screw. In addition, the lifting parts may be provided at both sides of the screw axis 413 so as to move to the center of the screw axis 413 if the driving motor 414 is driven. In particular, the screw axis 413 may be provided at both sides of the longitudinal side of the lower stage 122. The support 412 has one end screwed into the screw axis 413 to move along the screw axis 413, and the other end of the support 412 is fixed to both ends of the lift-bar 411. If two supports 412 support one lift-bar 411, drooping of the lift-bar 411 may be prevented. Thus, in the preferred embodiment of the present invention, one lifting part includes two supports 412 and one lift-bar 411.

Furthermore, the driving motor 414 may be connected with the screw axes 413, or any one of the screw axes 413. Accordingly, the screw axis 413 which is not connected with the driving motor 414 may not have a screw thread. The lifting part may be arranged to be lower than the upper surface of the upper stage 122 when it is not driven. Moreover, a driving means 415 may be further provided, which moves the support 412 along the vertical direction. Accordingly, either a hydraulic cylinder that can move the support 412 along the vertical direction using pneumatic pressure or hydraulic pressure, or move the support 412 using a step motor that can move the support 412 along the vertical direction using a rotational moving force is used as the driving means 415. A shape of the support 412 may depend on the driving means 415. One end 416 of the screw axis 413 may be a fixed part that prevents an opposite side of a side fixed to the driving motor 414 from drooping and moving.

The substrate bonding process using the aforementioned bonding device for an LCD according to the present invention will now be described. The loader part 300 controls the first and second arms 310 and 320 so that the second substrate 520 to be loaded to the upper stage 121 and the first substrate 510 to be loaded to the lower stage 122 are respectively fed thereto. Accordingly, the loader part 300 controls the second arm 320 so that the second substrate 520 is carried into the upper stage 121 in the vacuum processing chamber 110, through an opened vacuum chamber entrance 111 of the vacuum processing chamber 110.

A vacuum pump 123 may be connected to the upper stage 121 to transfer a vacuum force to each of the plurality of vacuum holes 121*b* formed in the upper stage 121 so that the second substrate 520 is affixed to the lower surface of the upper stage 121 by vacuum absorption. The second arm 320 may unload the bonded substrates. Thereafter, if the second arm 320 moves out of the vacuum processing chamber 110, the loader part 300 controls the first arm 310 so that the first substrate 510 may be carried into the lower stage 122 provided at a lower space in the vacuum processing chamber 110. Then, a vacuum pump (not shown) connected to the lower stage 122 may transfer a vacuum force to each of the plurality of vacuum holes (not shown) formed in the lower stage 122 so that the first substrate 510 is affixed to the lower stage 122 by vacuum absorption. Once the first arm 310 moves out of the vacuum processing chamber 110, loading of the first and second substrates 510 and 520 is completed.

During the process, loading of the second substrate 520 on which a sealant is dispensed is carried out earlier than loading of the first substrate 510. This prevents any dust and the like that may be present in the process of loading the second substrate 520 from falling onto the first substrate 510 upon which the liquid crystal material is dropped. Once loading of the first and second substrates 510 and 520 is completed, an vacuum chamber entrance 111 of the vacuum processing chamber 110 is closed so that a closed state is maintained inside the vacuum processing chamber 110. Afterwards, the vacuum device 200 is enabled to generate a vacuum pressure within the interior of the vacuum processing chamber 110. Accordingly, the air outlet valve 112*a* provided with the air exhaust pipe 112 of the vacuum processing chamber 110 opens the air exhaust pipe 112 to transfer the vacuum force into the vacuum processing chamber 110, thereby gradually creating a vacuum pressure inside the vacuum processing chamber 110.

The driving means 415 operates to move each support 412 along an upward direction. At the same time, a pair of driving motors 414 constructing the moving part are driven to rotate a pair of screw axes 413. Thus, a pair of lifting parts fixed to both ends of each screw axis 413 move toward the center of each screw axis 413 to correspond to a direction of each screw axis 413. In other words, a pair of supports 412 constructing each lifting part move to the center of the screw axis 413 by a horizontal moving force due to rotation of the screw axis 413, thereby moving the lift-bar 411. Accordingly, once each lifting part moves by a set distance, each driving motor 414 is not driven, thereby resulting in that the lifting part stops. The position of each lifting part is controlled by controlling driving time or driving degree of each driving motor 414. Preferably, each lifting part stops below the dummy area of the second substrate 520.

Once the above process is completed, the operation of the vacuum pump 123 is disabled, thereby cutting off the vacuum force that affixes the second substrate 520 to the lower surface of the upper stage 121. Thus, the second substrate 520 affixed at the lower surface of the upper stage 121 drops, and is then placed on an upper surface of each lift-bar 411. Accordingly, the process of placing the second substrate onto each lift-bar 411 may be carried out to release the vacuum force after the second substrate 520 is in contact with each lift-bar 411 by downwardly moving the upper stage 121 or by upwardly moving lift-bar 411. In this case, it may be possible to avoid any damage that may occur due to impact between the second substrate 520 and each lift-bar 410 when the second substrate 520 is dropped.

Afterwards, once the complete vacuum state is achieved in the vacuum processing chamber 110 by driving the vacuum device 200 for a certain time period, driving of the vacuum device 200 stops and at the same time the air outlet valve 112a of the air exhaust pipe 112 operates, so that the air exhaust pipe 112 is maintained in a closed state.

The power is applied to the electrostatic chucks 121a and 122a of the upper and lower stages 121 and 122 so that the respective substrates 510 and 520 are electrostatically affixed onto the first and second stages 121 and 122, respectively. Once the electrostatically affixation is completed, the substrate receiving system returns the respective lift-bars 411 and the respective supports 412 to their original position. Afterwards, the stage moving system selectively move the upper and lower stages 121 and 122 along the vertical direction so that the first and second substrates 510 and 520 electrostatically affixed onto the first and second stages 121 and 122 are bonded to each other.

Meanwhile, the driving of the substrate receiving system may not be limited to the aforementioned construction that drives the substrate receiving system in the process of generating the vacuum pressure inside the vacuum processing chamber 110. That is, the substrate receiving system may be driven before the vacuum pressure is attained inside the vacuum processing chamber 110 after loading of the first and second substrates 510 and 520.

Figure 8:
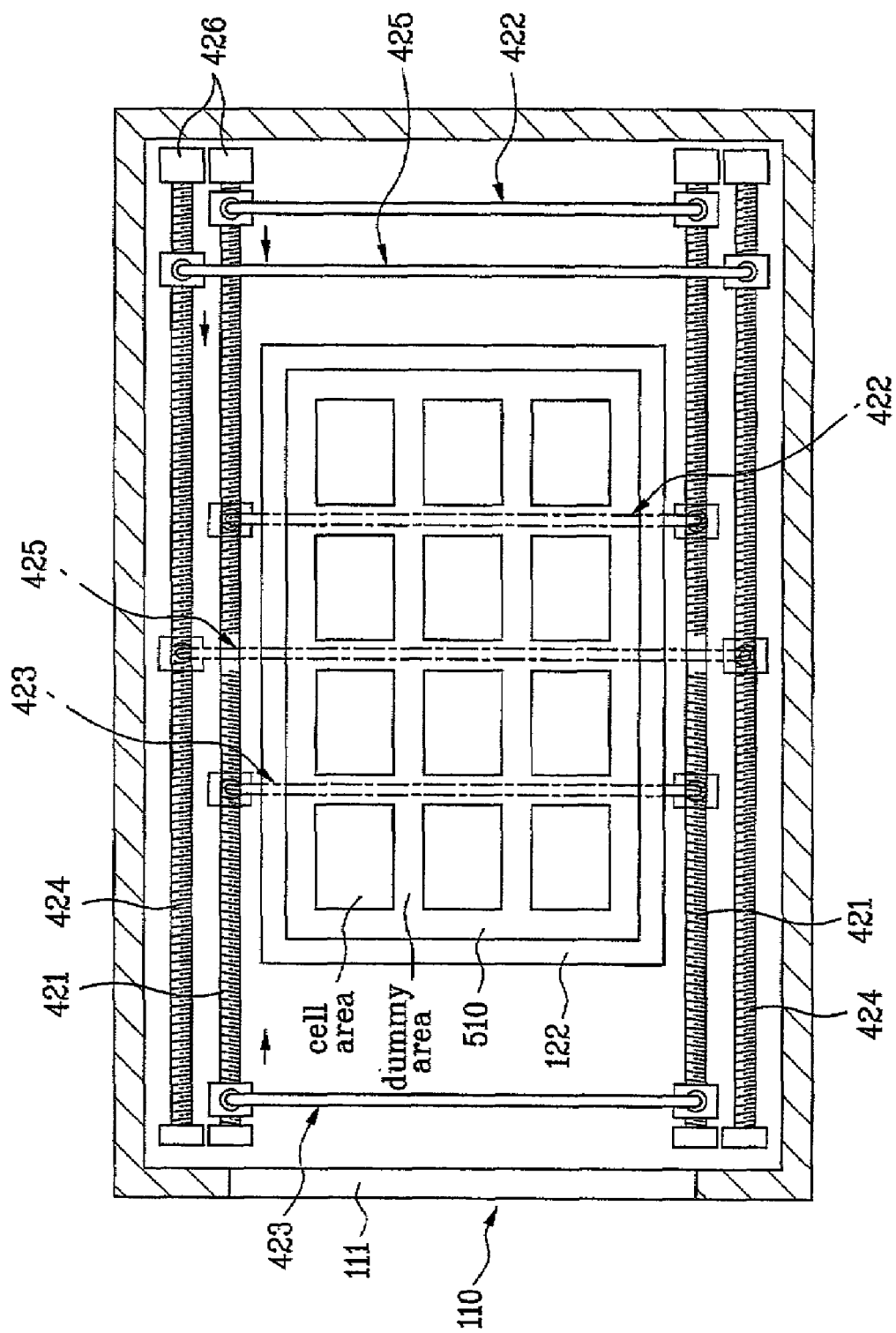
FIG. 8 is a plane view showing an internal structure of an exemplary apparatus having a substrate receiving system according to the present invention.
Figure 9:
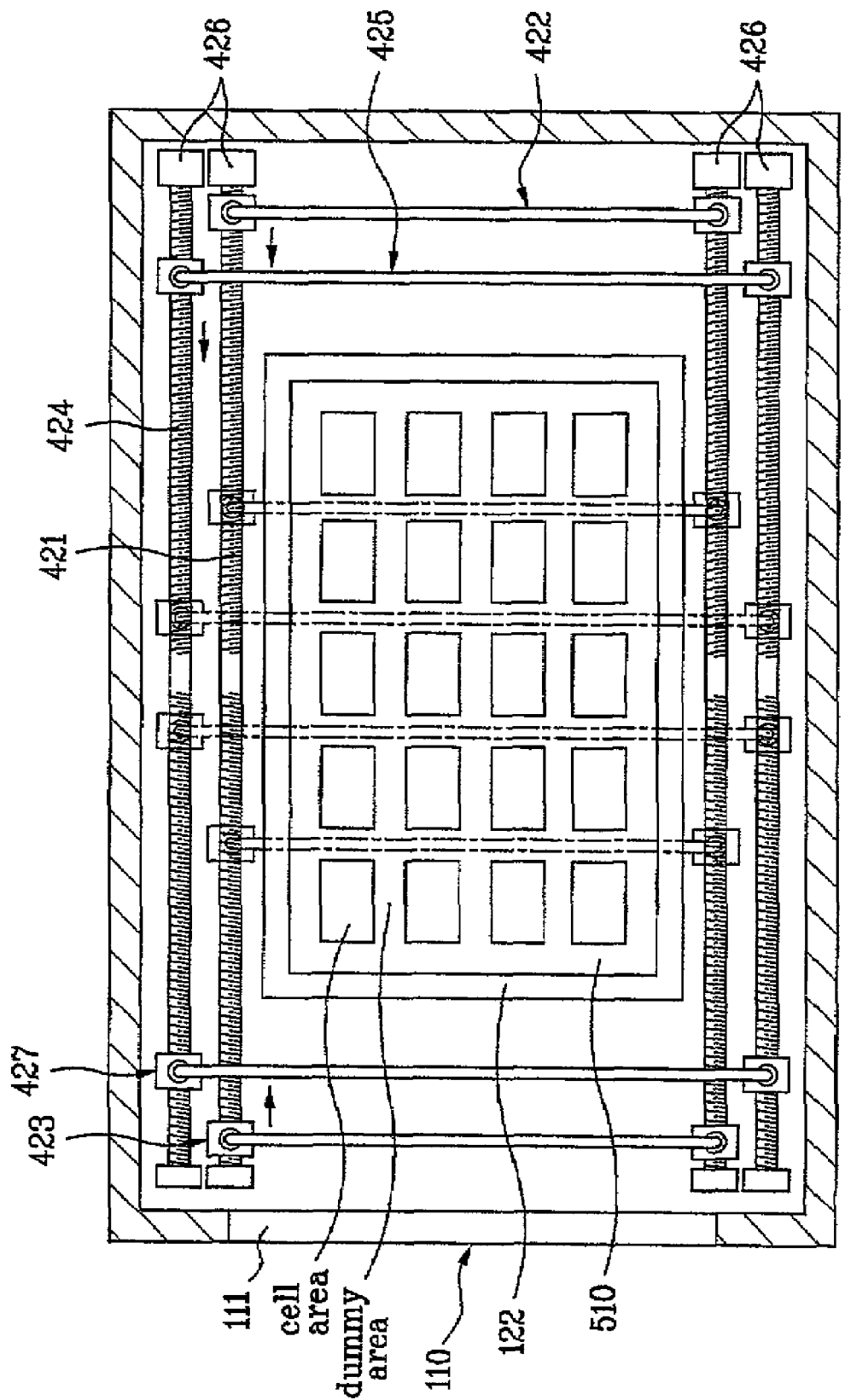
FIG. 9 is a plane view showing an internal structure of another exemplary apparatus according to the present invention.

FIGS. 8 and 9 are plane views showing internal structures of exemplary apparatus' having a substrate receiving system according to the present invention. The substrate receiving system according to the second embodiment of the present invention may include two or more pair of screw axes so that three or four lifting parts selectively move, since the number of lifting parts depends on a model or size of the substrate.

In FIG. 8, if there are three lifting parts, a pair of first screw axis 421 provided nearest to the lower stage 122 are formed so that the screw directions at both sides around the center are directed in different directions. That is, one side of the first screw axis 421 is provided with a right-hand screw while the other side of the first screw axis 421 is provided with a left-hand screw. In addition, a first lifting part 422 and a second lifting part 423 may be provided at both ends of the first screw axis 421 to correspond to each other. A pair of second screw axis 424 may be provided more outwardly as compared to the first screw axis 421 are formed in one screw direction. A third lifting part 425 may be provided at one end of the second screw axis 424. Accordingly, the first and second screw axes 421 and 424 may be axially fixed to corresponding driving motors 426. Thus, once each driving motor 426 is driven to rotate the respective screw axes 421 and 424, the first lifting part 422 and the second lifting part 423 respectively move to the center of the first screw axis 421 while the third lifting part 425 moves to the center of the second screw axis 424, thereby resulting in that the lifting parts stop on preset positions.

In the above construction, the first screw axis 421 may be formed in one direction, and the second screw axis 424 may be formed so that both sides around the center are directed in different directions. In this case, the first lifting part 422 and the second lifting part 423 may be provided at both ends of the second screw axis 424 while the third lifting part 425 may be provided at any one end of the first screw axis 421.

In FIG. 9, four lifting parts are required depending on a model of the substrate, and the second screw axis 424 has a similar shape as a shape of the first screw axis 421 while the third lifting part 425 and a fourth lifting part 427 are provided at both ends of the second screw axis 424. Thus, once each driving motor 426 is driven to rotate the respective screw axes 421 and 424, the first lifting part 422 and the second lifting part 423 respectively move to the center of the first screw axis 421 while the third lifting part 425 and the fourth lifting part 427 respectively move to the center of the second screw axis 424, thereby resulting in that the lifting parts stop on preset positions.

Figure 10:
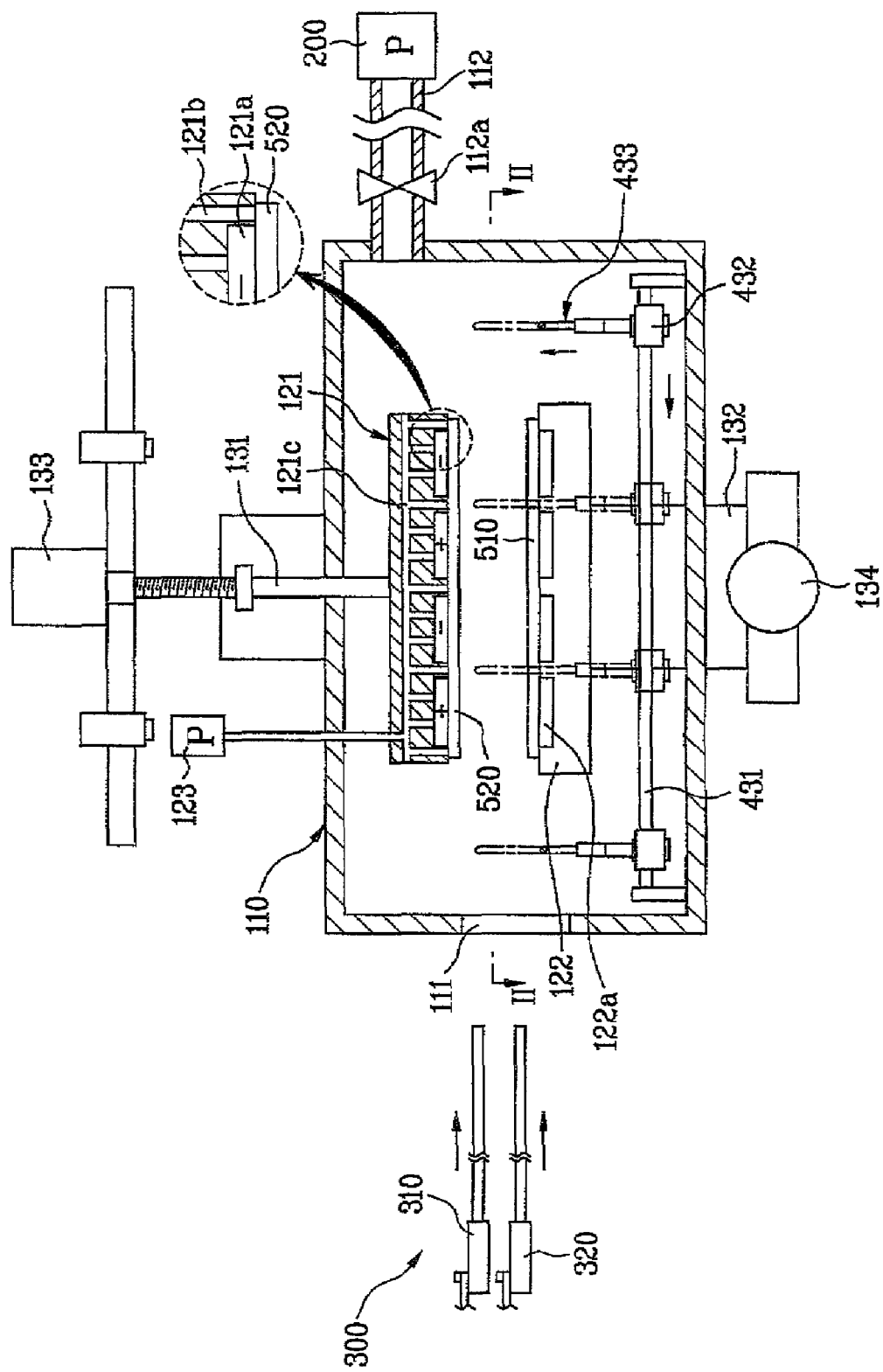
FIG. 10 is a cross sectional view showing an internal structure of another exemplary apparatus according to the present invention.
Figure 11:
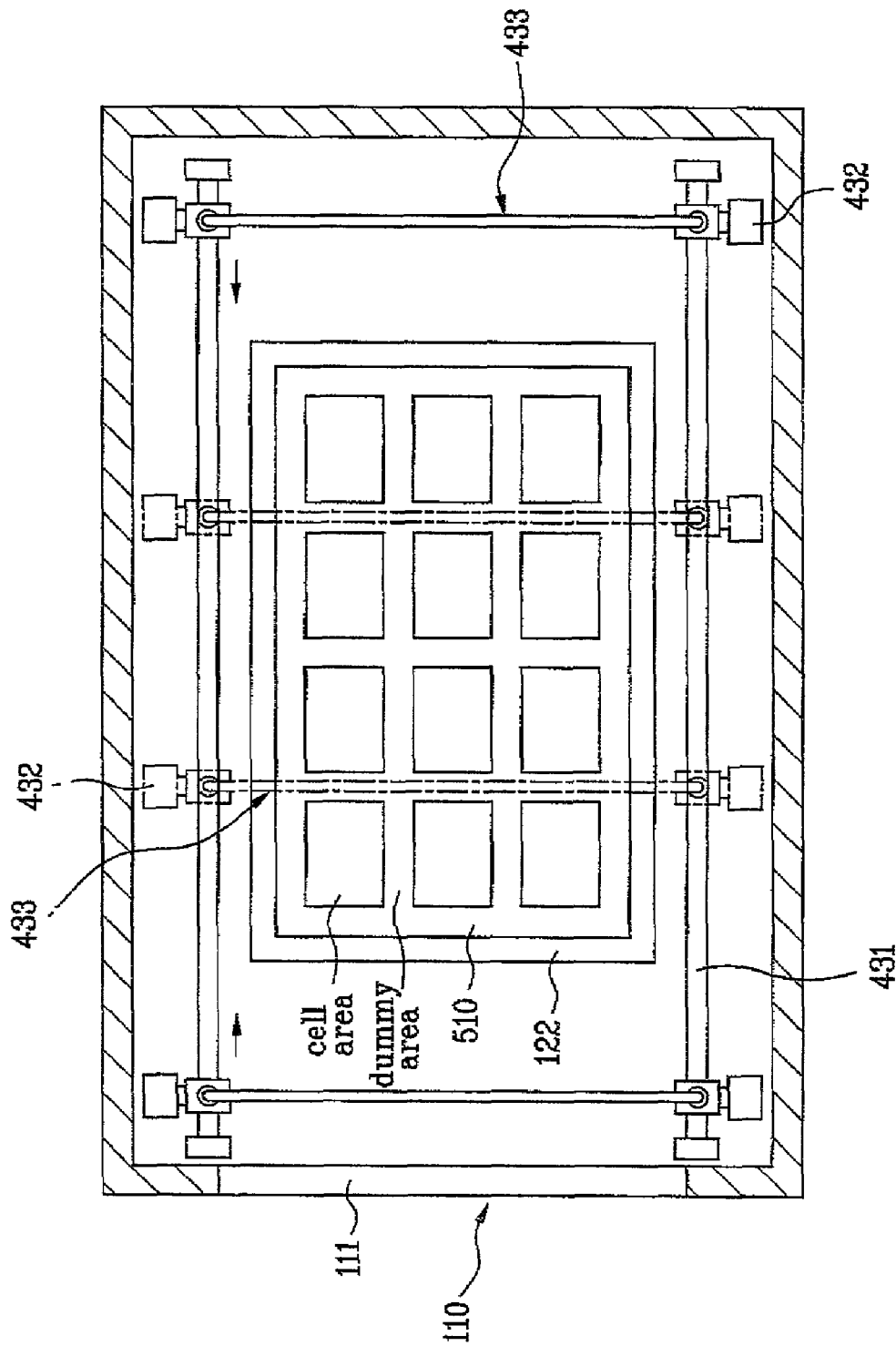
FIG. 11 is a plane view along line II-II of FIG. 10.

FIGS. 10 and 11 illustrate an exemplary substrate receiving system according to the third embodiment of the present invention. The substrate receiving system according to the third embodiment of the present invention is constructed such that the moving part selectively controls and moves a plurality of lifting parts.

In FIG. 10, the moving part may include a moving system 432 and operates to move the lifting parts 433 along the horizontal direction. The moving system 432 may be directly connected with the moving axis 431 and the lifting parts 433 and may be driven to move the lifting part along the moving axis 431. The lifting parts 433 may be connected with the moving axis 431. In particular, a typical guide rail may be used as the moving axis 431, and a linear motor may be used as the moving system 432. Accordingly, the moving system 432 may be connected with a connection portion between the lifting parts 433 and the moving axis 431 so that the lifting parts 433 move along the moving axis 431. All of the lifting parts 433 may be positioned at any one end of the moving axis 431. Alternatively, the lifting parts 433 may be positioned respectively at both ends of the moving axis 431.

Figure 12:
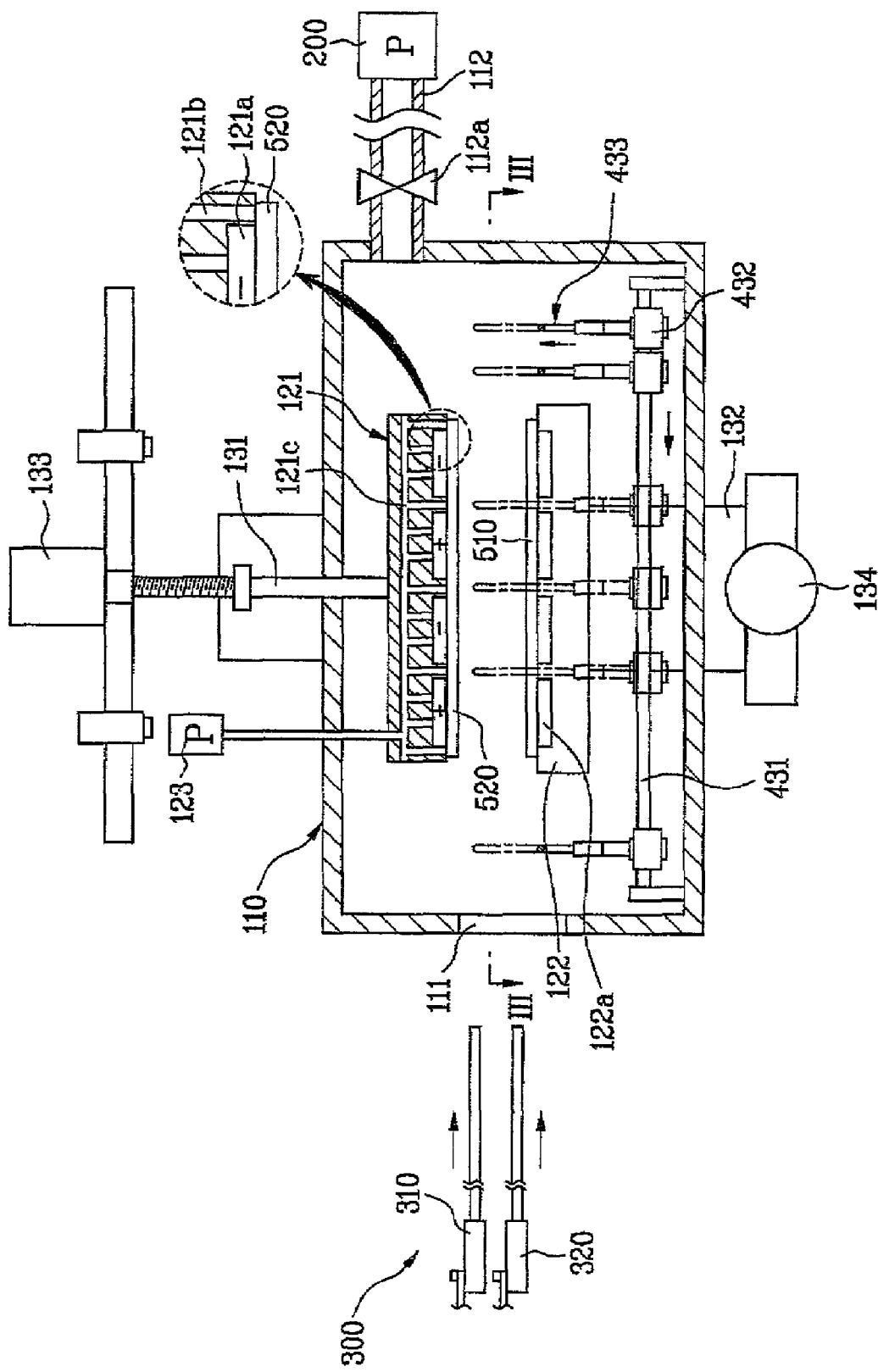
FIG. 12 is a cross sectional view showing another exemplary apparatus according to the present invention.
Figure 13:
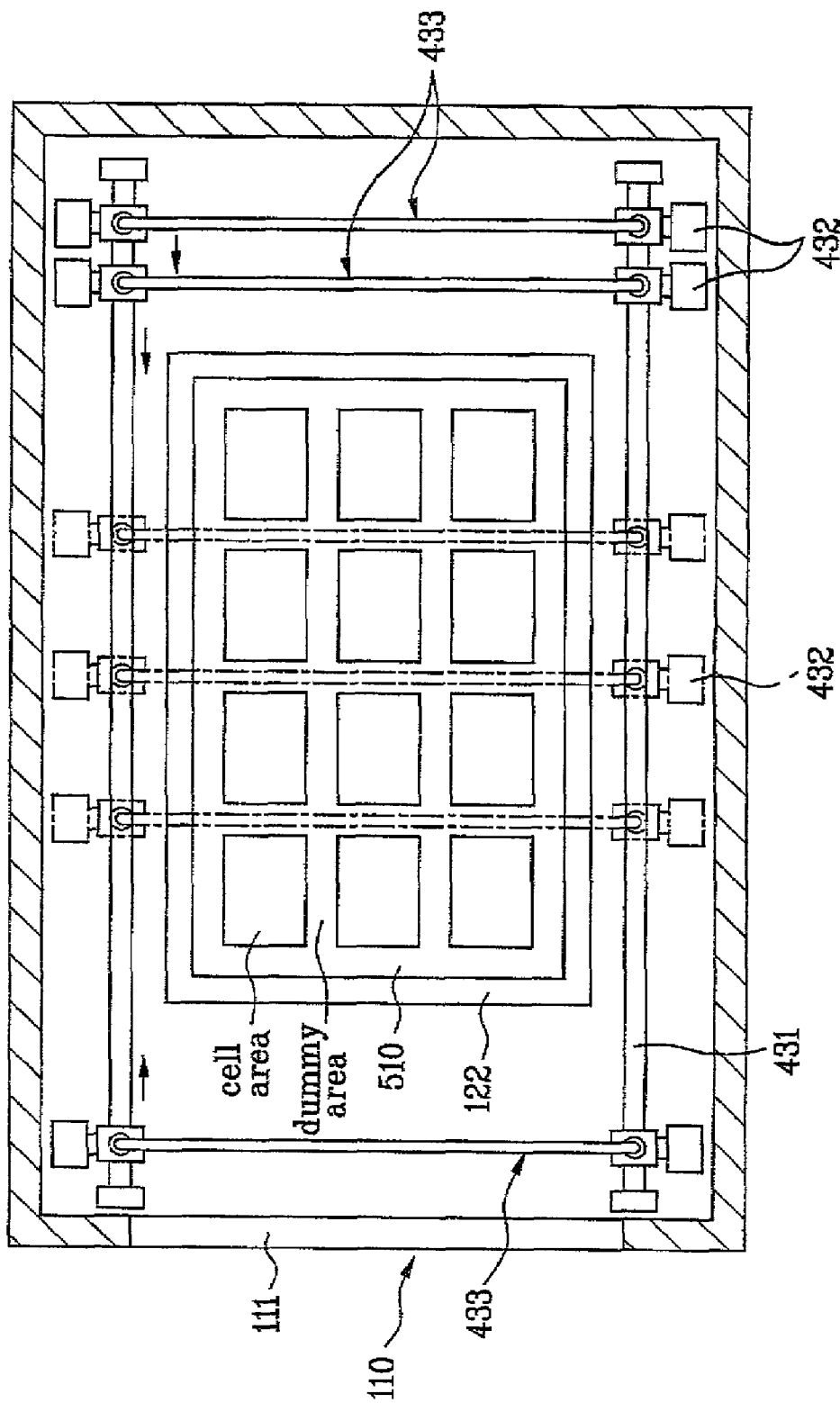
FIG. 13 is a plane view along line III-III of FIG. 12.

As described above, if the respective lifting parts 433 are separately controlled, as shown in FIG. 12 and FIG. 13, three or more lifting parts 433 may be provided. Thus, the substrate receiving system can receive the second substrate 520 in a more stable manner. Although not shown, rack, gear, or chain drive mechanisms may be used as the moving axis 431 and a motor axially fixed to pinion, gear, or sprocket wheel may be used as the moving system 432. Alternatively, a rail may be used as the moving axis 431 and a cylinder using hydraulic or pneumatic pressure may be used as the moving system 432.

Meanwhile, FIGS. 14 to 17 illustrate the substrate receiving system according to the fourth embodiment of the present invention. The substrate receiving system according to the fourth embodiment of the present invention is constructed such that one lift-bar 442 of the lifting part 441 may be supported by one support 443 only. In other words, the lift-bars 442 may be separated from each other around the center to oppose each other, so that the respective supports 443 connected to the respective moving axes 445 are separately controlled. Thus, any operational error due to operational error of the respective moving part may be prevented from occurring.

Figure 14:
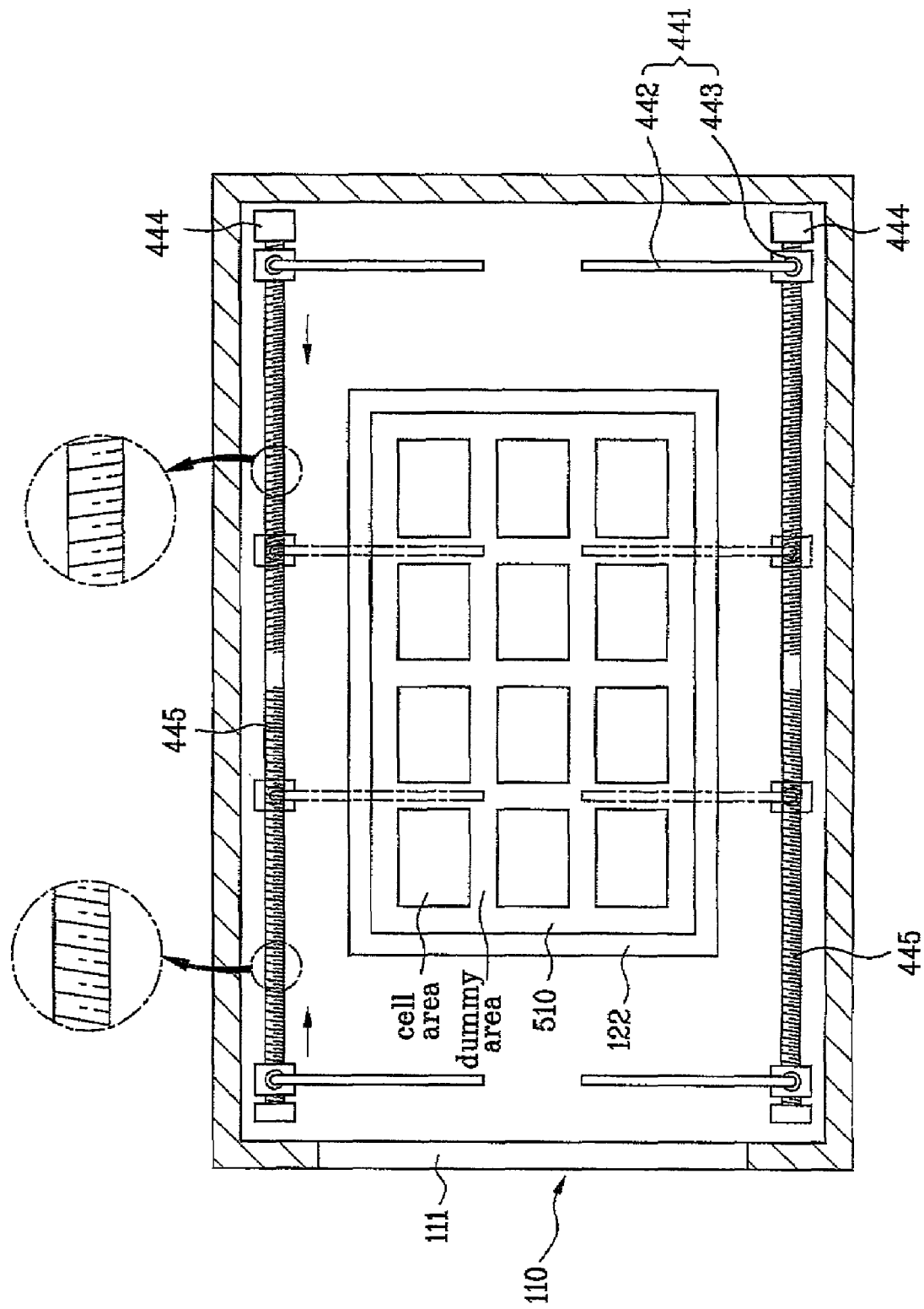
FIGS. 14 to 17 are plane views showing other exemplary apparatus' according to the present invention.
Figure 15:
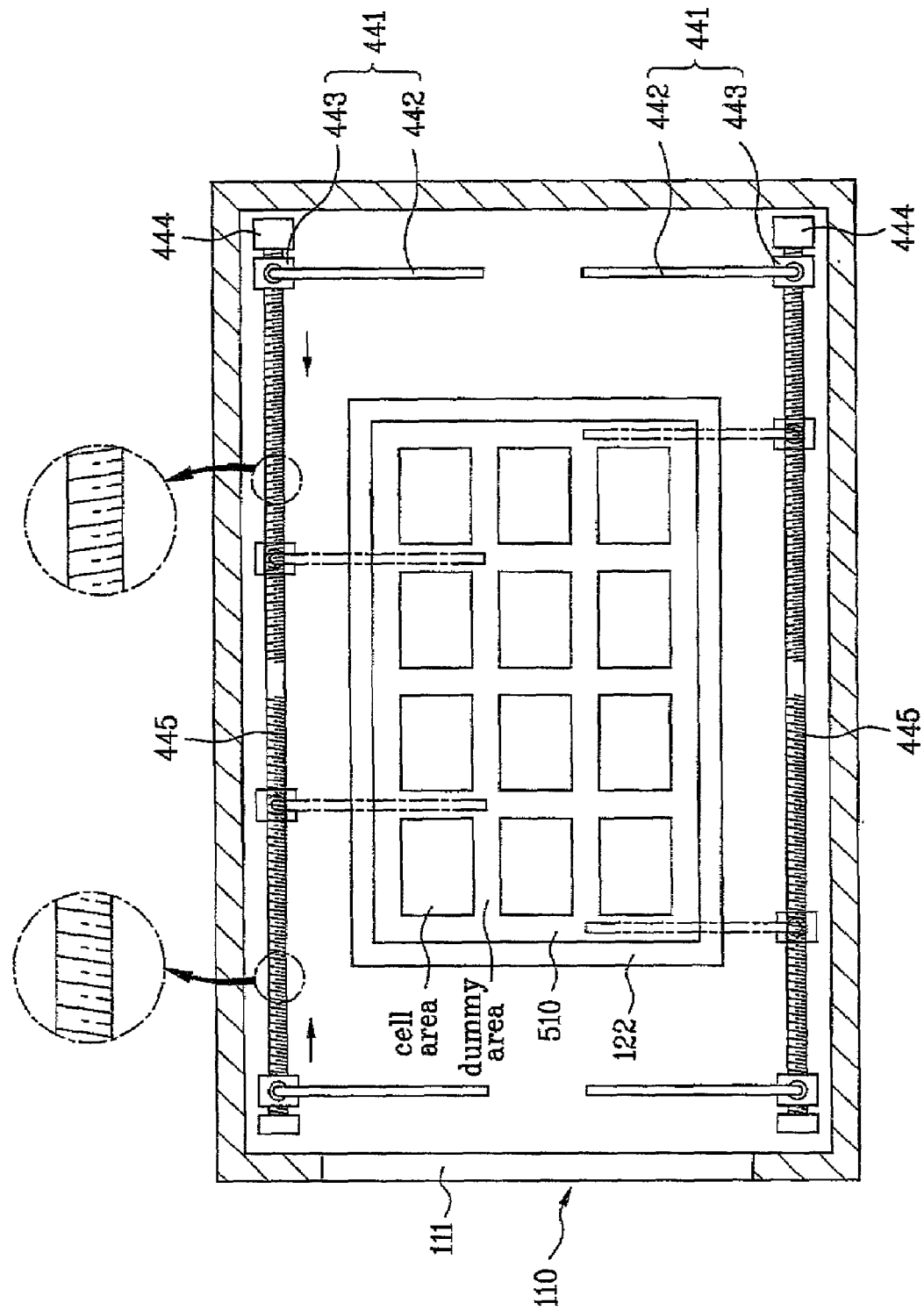
Figure 16:
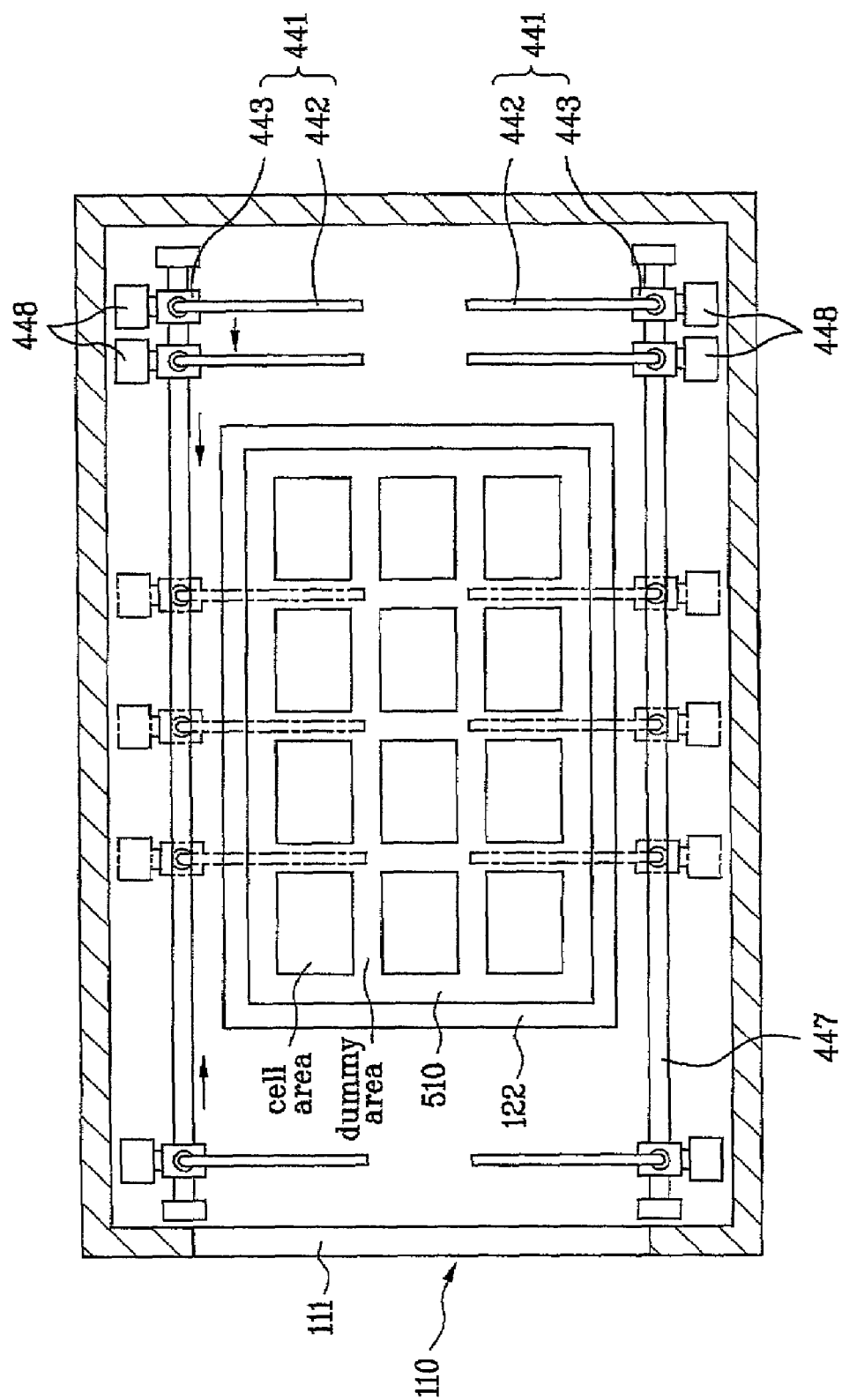

As shown in FIGS. 14 and 15, the moving part may be used as the screw axis 445 and the driving motor 444 according to the fourth embodiment of the present invention. Moreover, as shown in FIGS. 16 and 17, the moving part may be used as the moving axis 447 and the moving system 448 according to the fourth embodiment of the present invention.

Figure 17:
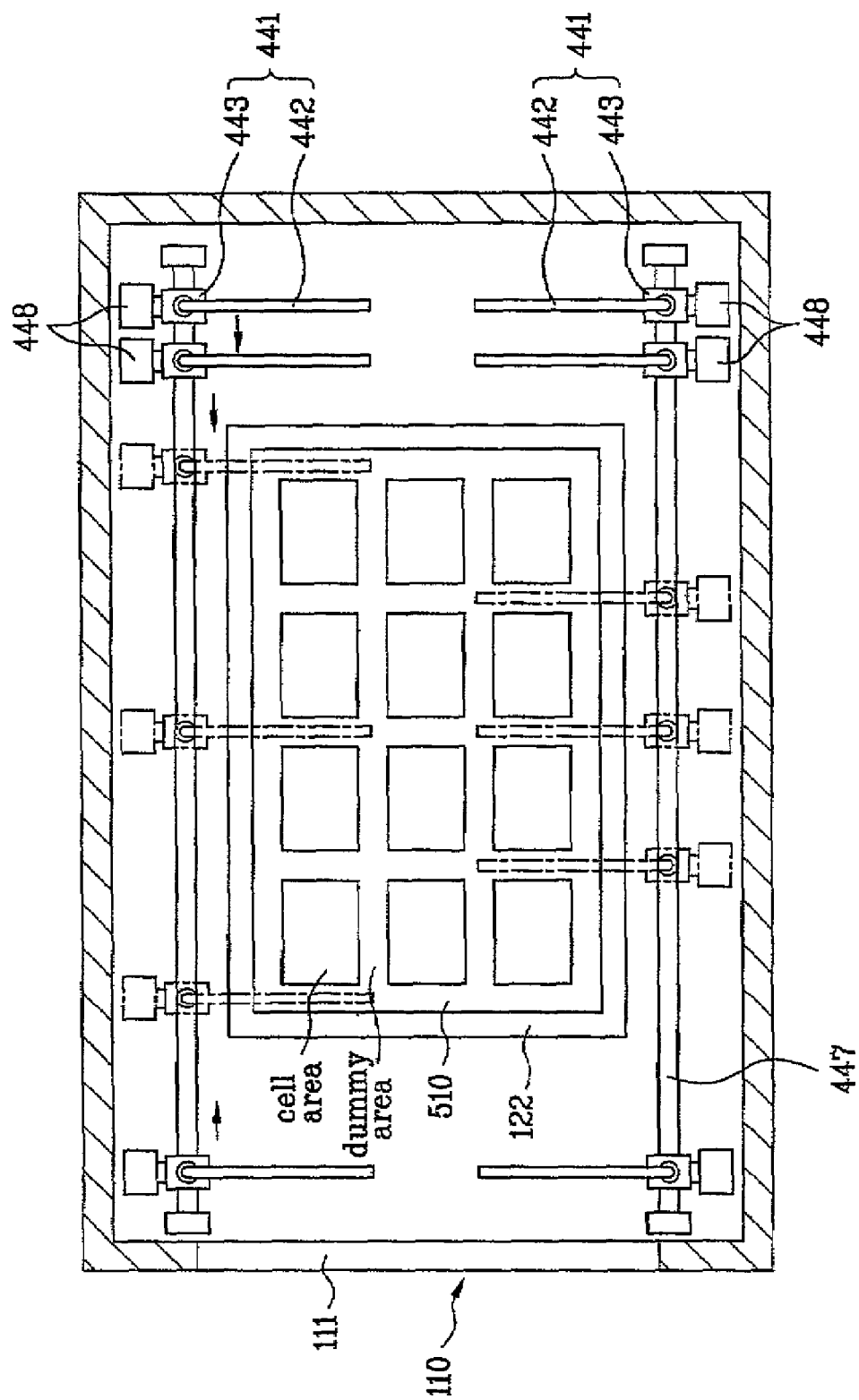

Particularly, as shown in FIGS. 15 and 17, when viewing an inner part of the vacuum processing chamber 110 from the plane, the respective lift-bars 442 may be arranged to cross each other so that the substrate receiving system may receive the second substrate 520 in a more stable manner.

Figure 18:
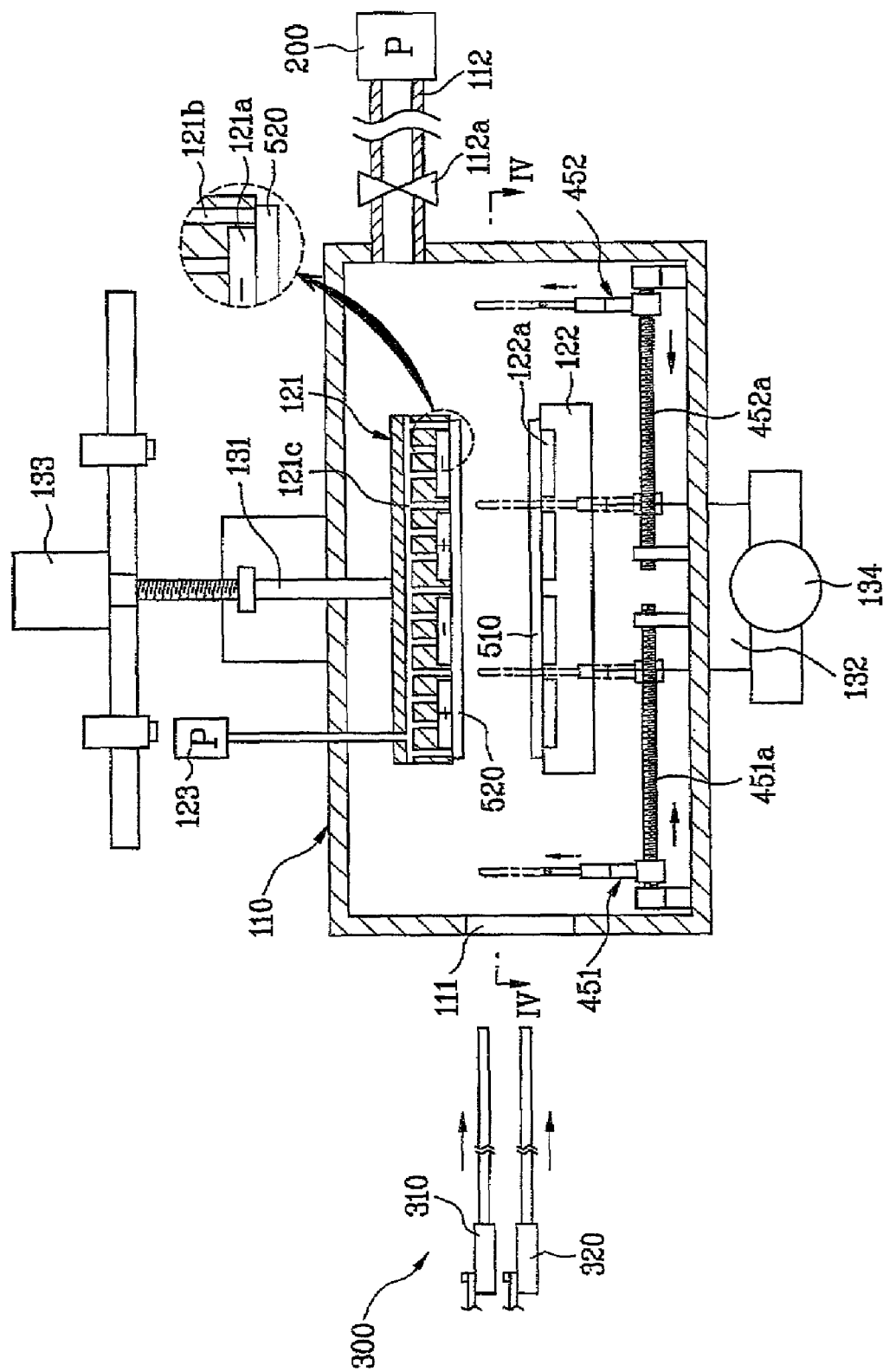
FIG. 18 is a cross sectional view showing another exemplary apparatus according to the present invention.
Figure 19:
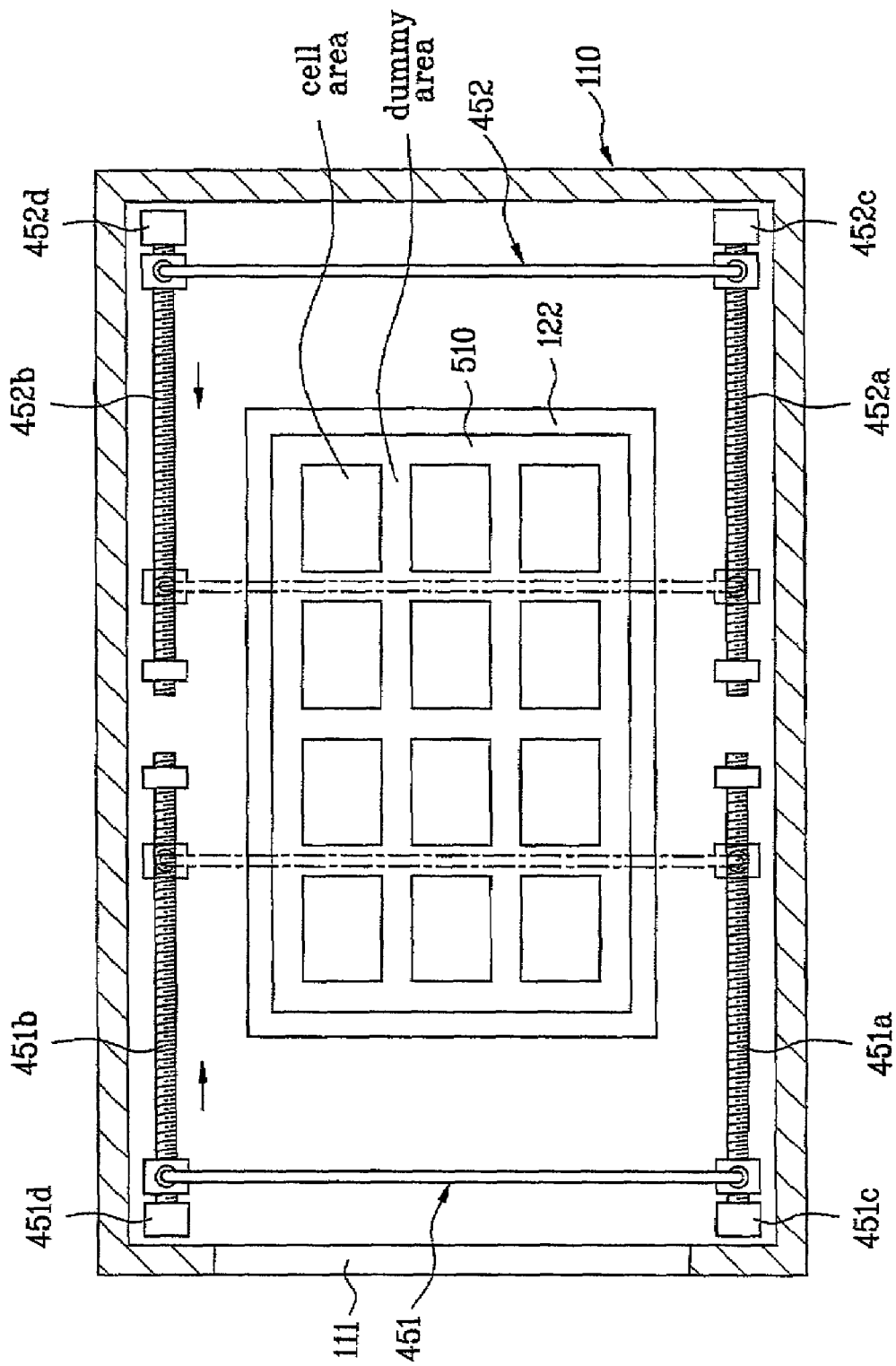
FIG. 19 is a plane view along line IV-IV of FIG. 18.

FIGS. 18 and 19 illustrate the substrate receiving system according to the fifth embodiment of the present invention. In the fifth embodiment of the present invention, two substrate receiving system may be formed to oppose each other at a portion adjacent to the lower stage 122. In FIG. 19, a first substrate receiving system 451 of the two substrate receiving system may be provided at a portion where the vacuum chamber entrance 111 is formed in the vacuum processing chamber 110, and a second substrate receiving system 452 may be provided at a portion opposite to the first substrate receiving system 451.

Figure 20:
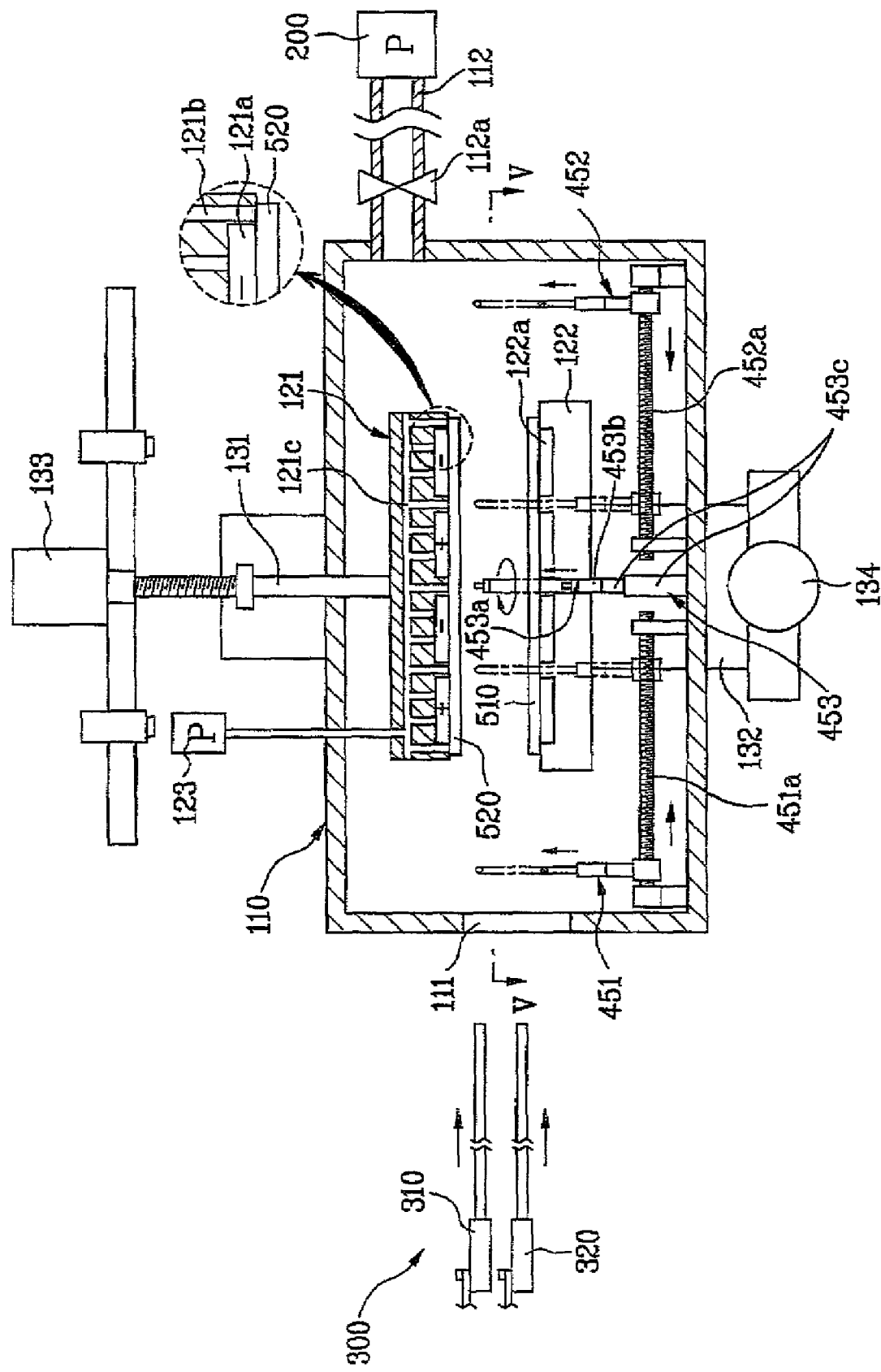
FIG. 20 is a cross sectional view showing another exemplary apparatus according to the present invention.
Figure 21:
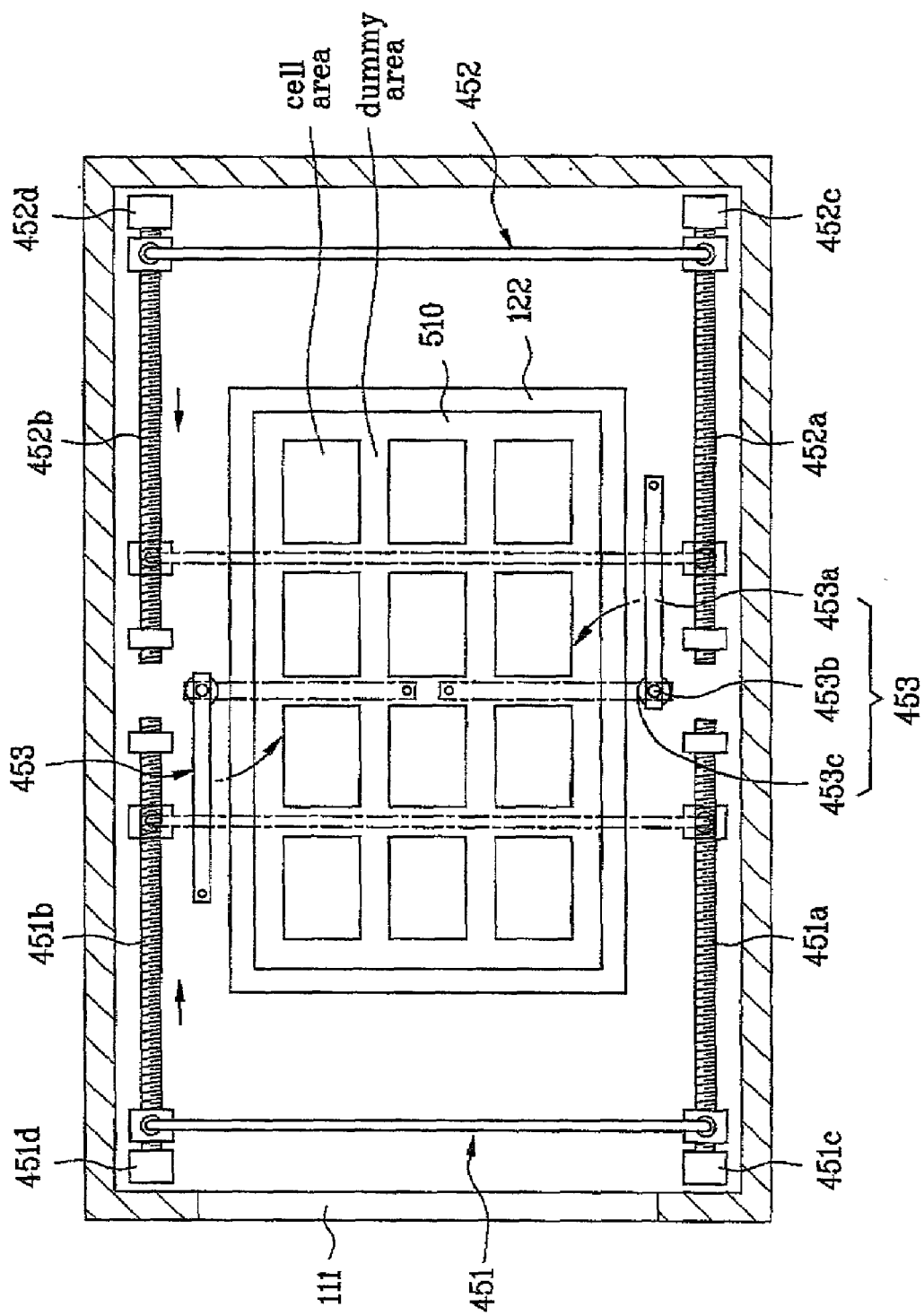
FIG. 21 is a plane view along line V-V of FIG. 20.

In the fifth embodiment of the present invention, screws of screw axes 451a, 451b, 452a, and 452b may be directed along one direction, and the screw axes 451a, 451b, 452a, and 452b may be controlled by driving motors 451c, 451d, 452c, and 452d, thereby enabling more precise movement. Meanwhile, in the construction of the fifth embodiment, there is no element that can receive the dummy area at the middle part of the second substrate 520. Therefore, in the sixth embodiment of the present invention, as shown in FIGS. 20 and 21, a rotational substrate receiving system 453 may be further provided, which receives the middle part of the second substrate 520 while moving upwardly or rotating clockwise or counterclockwise between the substrate receiving system 451 and 452. In this case, the rotational substrate receiving system 453 may include a support 453a, which is in contact with the second substrate 520, a connecting axis 453b connected with the support 453a, and a driving means 453c that provides a driving force to move the connecting axis 453b along the vertical direction and rotate the same clockwise or counterclockwise. At least any one of a cylinder using a hydraulic or pneumatic pressure and a motor may be used as the driving means 453c. In other words, when the substrate receiving system 451 and 452 move, the rotational substrate receiving system 453 moves along the vertical direction and rotates clockwise or counterclockwise so that the support 453a is placed below the dummy area at the middle part of the second substrate 520.

The substrate receiving system according to the present invention may not be limited to the construction that receives the lower surface of the second substrate 520 in a width direction while moving along a loading/unloading direction of the substrate. For example, as shown in FIG. 22 according to the seventh embodiment of the present invention, the substrate receiving system may be constructed to receive the lower surface of the second substrate 520, particularly the dummy area of the second substrate 520, in a length direction while moving in a direction vertical to the loading/unloading direction of the second substrate 520. Accordingly, a lift-bar 471 of the substrate receiving system may be longitudinally formed along a length direction of the second substrate 520, and one or two supports 472 are formed to support one lift-bar 471. Moreover, the moving part of the substrate receiving system according to the present invention may not be limited to the construction that is provided at a lower part in the vacuum processing chamber 110.

For example, as shown in FIG. 23 according to the eighth embodiment of the present invention, the moving part may be provided at an upper part in the vacuum processing chamber 110. That is, each moving part according to the first to seventh embodiments of the present invention may be provided at an upper part in the vacuum processing chamber.

It will be apparent to those skilled in the art that various modifications and variations can be made in the apparatus and method for manufacturing liquid crystal display devices, method for using the apparatus, and device produced by the method of the present invention without departing from the spirit or scope of the invention. Thus, it is intended that the present invention cover the modifications and variations of this invention provided they come within the scope of the appended claims and their equivalents.

What is claimed is:

1. An apparatus for manufacturing a liquid crystal display device, comprising:
a unitary vacuum processing chamber;
an upper stage affixing a second substrate and a lower stage affixing a first substrate having a liquid crystal predisposed thereon; and
a substrate receiving system provided within the vacuum processing chamber, moving along a first direction of the second substrate, and receiving and placing the second substrate onto a surface of the upper stage.

2. The apparatus according to claim 1, wherein the substrate receiving system is provided at one of a upper surface and a lower surface within the vacuum processing chamber.

3. The apparatus according to claim 1, wherein the substrate receiving system is provided at four corners within the vacuum processing chamber.

4. The apparatus according to claim 3, wherein the substrate receiving system includes a plurality of lifting parts receiving the lower surface of the second substrate, and a plurality of moving parts moving the lifting parts along the first direction of each substrate.

5. The apparatus according to claim 4, wherein each of the lifting parts includes a lift-bar contacted with the second substrate, having a length shorter than a width of the second substrate, and a support having a first end vertically connected to the lift-bar and a second end connected to the moving part to support the lift-bar.

6. The apparatus according to claim 3, further comprising a rotational substrate receiving system provided between two substrate receiving system provided at two opposing corners, the rotational substrate receiving system receiving a dummy area at a middle part of the second substrate while moving upwardly and rotating one of a clockwise and a counterclockwise direction.

7. The apparatus according to claim 6, wherein the separate substrate receiving system includes a support contacted with the second substrate, a connecting axis connected with the support, and a driving means that provides a driving force to move the connecting axis along a vertical direction and rotate about one of a clockwise and a clockwise direction.

8. The apparatus according to claim 1, wherein the substrate receiving system includes a plurality of lifting parts receiving the second substrate, and a plurality of moving parts moving the lifting parts along a loading/unloading direction of each substrate.

9. The apparatus according to claim 8, wherein each of the plurality of lifting parts includes a lift-bar longitudinally formed along a second direction of the second substrate and contacted the second substrate, and a support having a first end vertically connected to the lift-bar and a second end connected to the moving part to support the lift-bar.

10. The apparatus according to claim 9, wherein the lift-bar includes at least one protrusion formed on the lift-bar.

11. The apparatus according to claim 10, wherein each protrusion is formed in an area of the upper surface of the lift-bar to correspond to a dummy area the second substrate.

12. The apparatus according to claim 9, wherein one lift-bar is connected with one support.

13. The apparatus according to claim 9, wherein one lift-bar is connected with two supports.

14. The apparatus according to claim 9, wherein the support includes a driving means that moves the support along an upward direction.

15. The apparatus according to claim 14, wherein the driving means includes one of a cylinder that moves the support along the upward direction using one of pneumatic and hydraulic pressure and a motor that moves the support along a vertical direction.

16. The apparatus according to claim 8, wherein a number of the lifting parts is at least two.

17. The apparatus according to claim 8, wherein the lifting parts are arranged to receive dummy areas of the second substrate.

18. The apparatus according to claim 8, wherein the moving part includes a screw axis longitudinally formed along a portion adjacent to a longitudinal side of a stage within the vacuum processing chamber, and a driving motor axially fixed to the screw axis.

19. The apparatus according to claim 18, wherein the screw axis is arranged so that both sides around the center of the screw axis are directed in opposite directions.

20. The apparatus according to claim 19, wherein the lifting parts are provided at both ends of the screw axis.

21. The apparatus according to claim 19, further comprising at least two screw axes provided at both ends of a stage within the vacuum processing chamber.

22. The apparatus according to claim 18, further comprising two screw axes provided at both sides of a stage within the vacuum processing chamber.

23. The apparatus according to claim 18, further comprising four screw axes provided in pairs at both sides of a stage within the vacuum processing chamber.

24. The apparatus according to claim 23, wherein two screw axes provided nearest to the stage are arranged so that both sides around the center are oriented in opposite directions while two screw axes provided furthest from the stage are arranged so that their screw directions are oriented in one direction.

25. The apparatus according to claim 24, wherein both ends of the two screw axes provided nearest to the stage are connected with two lifting parts while one end of the two screw axes provided furthest from the stage is connected with one lifting part.

26. The apparatus according to claim 23, wherein two screw axes nearest to the stage are arranged so that their screw directions are oriented in one direction while two screw axes provided furthest from the stage are arranged so that both sides around the center are oriented in opposite directions.

27. The apparatus according to claim 26, wherein one end of the two screw axes provided nearest to the stage is connected with one lifting part while both ends of the two screw axes provided furthest from the stage is connected with two lifting parts.

28. The apparatus according to claim 23, wherein the screw axes are formed so that both sides around the center are oriented in opposite directions while both ends of two screw axes provided nearest to the stage and both ends of two screw axes provided furthest from the stage are connected with two lifting parts.

29. The apparatus according to claim 8, wherein the moving part includes a moving axis longitudinally formed along a portion adjacent to a longitudinal side of a stage within the vacuum processing chamber, and a moving system directly to move the lifting parts along the moving axis.

30. The apparatus according to claim 29, wherein the moving axis is formed of a guide rail and the moving system is formed of a linear motor.

31. The apparatus according to claim 29, wherein the moving axis is formed of at least one of a rack, a gear, and a chain, and the moving system is formed of a motor axially fixed to at least one of a pinion, a gear, and a sprocket wheel.

32. The apparatus according to claim 29, wherein the moving axis is formed of a rail, and the moving system is formed of a cylinder using one of hydraulic and pneumatic pressure.

33. The apparatus according to claim 29, wherein a number of the lifting parts is at least two.

34. An apparatus for manufacturing a liquid crystal display device, comprising:
   a unitary vacuum processing chamber;
   an upper stage affixing a second substrate and a lower stage affixing a first substrate having a liquid crystal predisposed thereon; and
   a substrate receiving system provided within the vacuum processing chamber, moving along a direction vertical to a first direction of each substrate, and receiving and placing the second substrate onto a surface of the upper stage.

35. The apparatus according to claim 34, wherein the substrate receiving system includes a plurality of lifting parts receiving the second substrate, and a plurality of moving parts moving the lifting parts along the direction vertical to the first direction of each substrate.

36. The apparatus according to claim 35, wherein each of the lifting parts includes a lift-bar longitudinally formed along a second direction of the second substrate and contacting the lower surface of the second substrate, and a support having a first end vertically connected to the lift-bar and a second end connected to the moving part to support the lift-bar.

37. A method for manufacturing a liquid crystal display device, comprising:
   affixing a first substrate having a liquid crystal predisposed thereon onto a lower stage within a unitary vacuum processing chamber;
   affixing a second substrate onto an upper stage within the unitary vacuum chamber;
   receiving the second substrate onto a substrate receiving system provided within the unitary vacuum processing chamber, the substrate receiving system moving along a first direction of the first and second substrates to receive and place the second substrate onto a surface of the upper stage.

38. The method according to claim 37, wherein the substrate receiving system includes a plurality of lifting parts receiving the lower surface of the second substrate, and a plurality of moving parts moving the lifting parts along the first direction of each substrate.

39. The method according to claim 37, wherein the substrate receiving system is provided at one of a upper surface and a lower surface within the vacuum processing chamber.

* * * * *